(12) United States Patent
Van Horn

(10) Patent No.: US 10,563,971 B2
(45) Date of Patent: Feb. 18, 2020

(54) METHODS AND SYSTEMS FOR CALIBRATING A DIMENSIONER

(71) Applicant: Hand Held Products, Inc., Fort Mill, SC (US)

(72) Inventor: Erik Van Horn, Ocean View, NJ (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 40 days.

(21) Appl. No.: 16/023,667

(22) Filed: Jun. 29, 2018

(65) Prior Publication Data

US 2020/0003547 A1   Jan. 2, 2020

(51) Int. Cl.
  *G01F 25/00* (2006.01)
  *G01F 17/00* (2006.01)
  *G01B 11/02* (2006.01)
  *G06T 7/00* (2017.01)

(52) U.S. Cl.
  CPC .............. *G01B 11/022* (2013.01); *G06T 7/97* (2017.01)

(58) Field of Classification Search
  CPC ................................ G01B 11/022; G06T 7/97
  USPC .......................................................... 348/135
  See application file for complete search history.

(56) References Cited

U.S. PATENT DOCUMENTS

| 4,480,264 A   | * | 10/1984 | Duschl ................ | G01B 11/024 348/135 |
|---|---|---|---|---|
| 8,923,650 B2  |   | 12/2014 | Wexler   |   |
| 2015/0009338 A1 |   | 1/2015  | Laffargue et al. |   |
| 2016/0073104 A1 |   | 3/2016  | Hillebrand et al. |   |
| 2016/0104288 A1 | * | 4/2016  | Wexler ................... | G01C 11/04 348/135 |
| 2016/0370220 A1 |   | 12/2016 | Ackley et al. |   |

* cited by examiner

*Primary Examiner* — Hee-Yong Kim
(74) *Attorney, Agent, or Firm* — Alston & Bird LLP

(57) ABSTRACT

Various embodiments provide for a method for calibrating a dimensioner. An example method includes receiving two or more previously captured images of a common field of view of the dimensioner, and identifying at least one static object in the common field of view. The method further includes determining one or more reference dimensions of the at least one static object. Thereafter, the method includes detecting an event on the dimensioner, and when an event is detected, determining one or more updated dimensions of the at least one static object. The method includes comparing the one or more updated dimensions to the one or more reference dimensions to determine whether the one or more updated dimensions satisfy a predefined dimension error range. When the one or more updated dimensions fail to satisfy the predefined dimension error range, the method includes modifying one or more parameters associated with the dimensioner.

17 Claims, 13 Drawing Sheets ions of the at least one static object satisfy the predefined dimension error range.

Various embodiments illustrated herein disclose a dimensioner comprising a first image capturing device configured to capture a first current image of a common field of view of the dimensioner. Further, the dimensioner includes a second image capturing device configured to capture another current image of the common field of view of the dimensioner (e.g., a second current image). Additionally, the dimensioner includes a projector configured to project a pattern of light in the common field of view of the dimensioner. The second current image of the field of view of the second image capturing device is captured based on the projected pattern. Furthermore, the dimensioner includes a processor communicatively coupler with the first image capturing device and the second image capturing device. The processor is configured to receive two or more previously captured images of the common field of view. The processor is further configured to identify at least one static object in the common field of view of the first image capturing device. The at least one static object is common to each of the two or more previously captured images, and wherein the at least one static object is located at a fixed position in each of the two or more previously captured images. Furthermore, the processor is configured to determine one or more reference dimensions of the at least one static object based on the two or more previously captured images. In some examples, the processor is configured to detect an event on the dimensioner. In an instance in which the event is detected, the processor is configured to determine one or more updated dimensions of the at least one static object. Furthermore, the processor is configured to compare the one or more updated dimensions to the one or more reference dimensions to determine whether the one or more updated dimensions satisfy a predefined dimension error range. In an instance in which the one or more updated dimensions fail to satisfy the predefined dimension error range, the processor modifies one or more parameters associated with the dimensioner.

METHODS AND SYSTEMS FOR CALIBRATING A DIMENSIONER

TECHNOLOGICAL FIELD

Exemplary embodiments of the present disclosure relate generally to dimensioning systems and, more particularly, to methods and systems for calibrating a dimensioner.

BACKGROUND

Conventional dimensioners and associated dimensioning systems may include elements such as projectors and image capturing devices that operate to determine one or more dimensions of an object. These systems may operate to capture images of an object (e.g., via visible light, infra-red (IR) spectrum, or the like) and determine one or more dimensions of the object via a correlation between projected light patterns and captured images. Dimensioning systems may also require calibration in order to ensure that the determined dimensions accurately correspond to a targeted object. Over time, a correlation between projected light patterns and captured images may change due to extrinsic factors (e.g., temperature variations, repositioning of the dimensioner, etc.) resulting in incorrect determinations of the one or more dimensions of the object.

Applicant has identified a number of deficiencies and problems associated with conventional dimensioning systems. Through applied effort, ingenuity, and innovation, many of these identified problems have been solved by developing solutions that are included in embodiments of the present disclosure, many examples of which are described in detail herein.

BRIEF SUMMARY

Various embodiments illustrated herein disclose a method for calibrating a dimensioner. The method includes receiving, by a processor, two or more previously captured images of a common field of view of the dimensioner. The method further includes identifying, by the processor, at least one static object in the common field of view. The at least one static object is common to each of the two or more previously captured images. Further, the at least one static object is located at a fixed position in each of the two or more previously captured images. In some examples, the method further includes determining, by the processor, one or more reference dimensions of the at least one static object based on the two or more previously captured images. Furthermore, the method includes detecting, by the processor, an event on the dimensioner. In an instance in which the event is detected, determining, by the processor, one or more updated dimensions of the at least one static object. Additionally, the method includes comparing, by the processor, the one or more updated dimensions to the one or more reference dimensions to determine whether the one or more updated dimensions satisfy a predefined dimension error range. In an instance in which the one or more updated dimensions fail to satisfy the predefined dimension error range, modifying, by the processor, one or more parameters associated with the dimensioner.

In some example embodiments, the method further comprising iteratively modifying, by the processor, the one or more parameters of the dimensioner and iteratively determining, by the processor, the one or more updated dimensions of the at least one static object based on the one or more modified parameters, until the one or more updated

BRIEF DESCRIPTION OF THE DRAWINGS

The description of the illustrative embodiments may be read in conjunction with the accompanying figures. It will be appreciated that for simplicity and clarity of illustration, elements illustrated in the figures may not necessarily been drawn to scale. For example, the one or more dimensions of some of the elements may exaggerated relative to other elements. Embodiments incorporating teachings of the present disclosure are shown and described with respect to the figures presented herein, in which.

DETAILED DESCRIPTION

Figure 1:
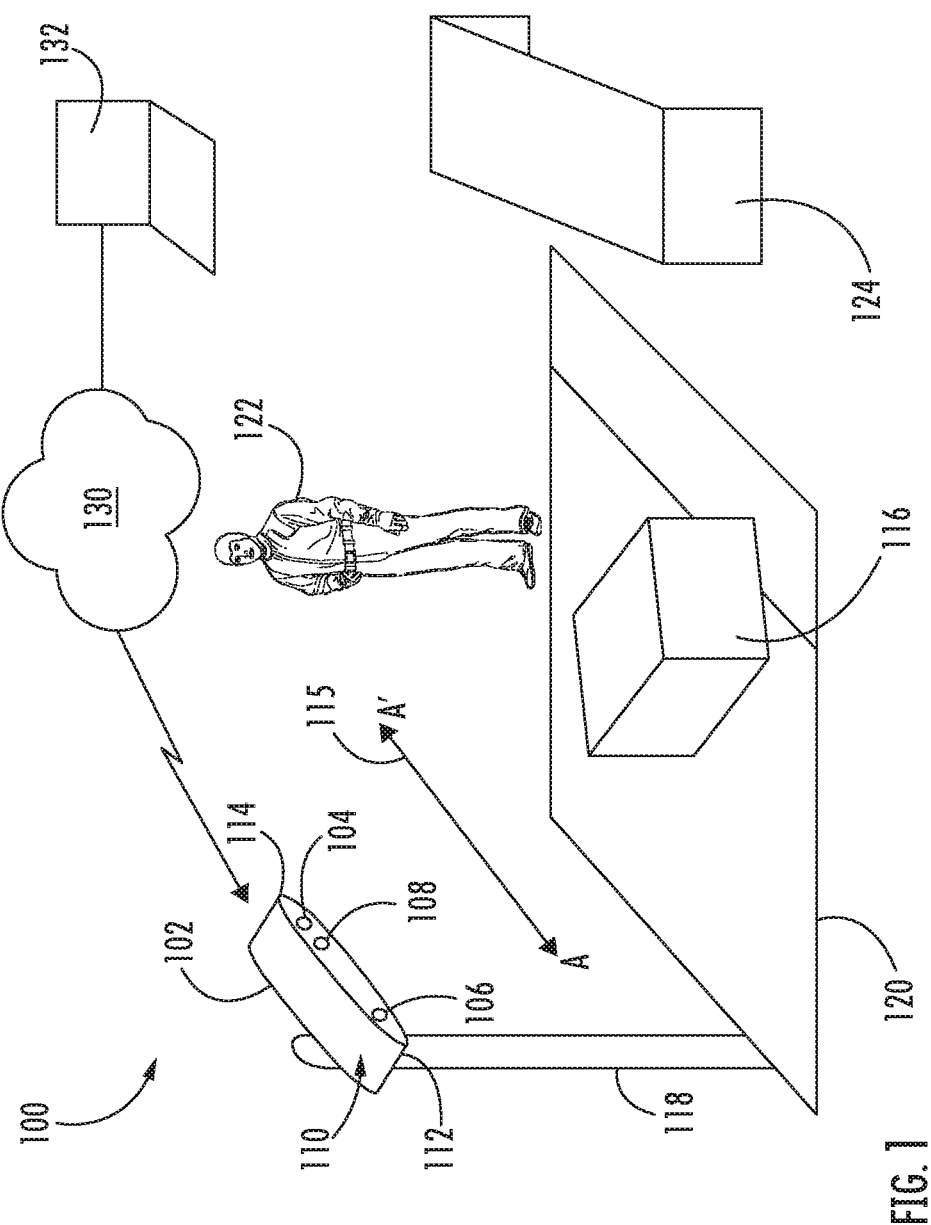
FIG. 1 illustrates an exemplary material handling environment, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The term "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "image" as used herein may correspond to a representation of an information/data in the form of plurality of pixels in an image plane that may be either a 2-dimensional plane or a 3-dimensional plane. In some examples, the image may represent information/data of a scene where each pixel in the plurality of pixels may, for example, represent a point in the scene. Furthermore, each pixel in the plurality of pixels may include and associated color information and intensity information. Color information may be represented in form of one or more color schemes such as, but not limited to, RGB color scheme, CMYK color scheme, monochrome color scheme, grayscale color scheme, and/or the like. In some example embodiments, the intensity information may be representative of a brightness associated with each pixel. In some example embodiments, the pixel may further include depth information that may correspond to a distance of the point, represented by the pixel, from an image capturing device that captured the image. In an example embodiment, the image may be encoded and represented in one or more formats such as JPEG, Bitmap, PNG, RAW, and/or the like.

The term "object" as used herein may correspond to a physical item, element, device, or the like that present in a scene that is captured by an image capturing device such as a camera. For example, a warehouse or a retail outlet (e.g., a scene) may include objects, parcels, cartons, shipping containers, and/or the like. In some examples, the object may be a static object or a dynamic object. The static object in a scene may correspond to an object which remains substantially stationary over a period of time. For example, static objects in a warehouse may include structural support elements, such as pillars, walls, and/or the like of the warehouse. A dynamic object may correspond to an object with a location in the warehouse that is not fixed. For example, the location of one or more parcels in warehouse may not be fixed, as the one or more parcels may be shipped-in, shipped-out, or otherwise moved in the warehouse (e.g., scene).

The terms "one or more dimensions" as used herein may correspond to any measurement indicative of a size of an object. For example, the one or more dimensions of a cuboidal parcel in a warehouse environment (e.g., scene) may include a measurement of a height of the parcel, a length of the parcel, and/or a width of the parcel. In some example embodiments, the one or more dimensions of an object having an irregular shape may be defined as a measurement of a size of a virtual cuboidal box that encompasses the irregular object (e.g., a length, width, and height of the virtual cuboid).

A dimensioner of the present disclosure may include a projector, a first image capturing device, and a second image capturing device. The projector and the second image capturing device may operate in the same light spectrum range (e.g., the infra-red IR light spectrum range). The projector may be configured to project structured light in a common field of view of the projector and the second image capturing device. Thereafter, the second image capturing device may be configured to capture an image of the projected structured light. Based on the image, the dimensioner may be configured to determine one or more dimensions of various objects in the common field of view. The dimensioner may determine the one or more dimensions based on one or more parameters of the dimensioner such as, but not limited to, a correlation between the projector and the second image capturing device. In an example embodiment, the dimensioner may be configured to determine the one or more parameters prior to determining the dimensions of the object. Further, the dimensioner may determine the one or more parameters during a calibration of the dimensioner. In an example embodiment, the one or more parameters may include, but are not limited to, a correlation between the projector and the second image capturing device, the focal length of the second image capturing device, the focal length of the first image capturing device, and/or the focal length of the projector.

Due to various extrinsic factors such as an ambient temperature of the dimensioner, movement of the dimensioner, or the like, the dimensioner may become out of calibration. In an example embodiment, the dimensioner may be configured to identify an instance in which it is out of calibration. For example, the dimensioner may receive two or more previously captured images of the field of view. From the two or more previously captured images, the dimensioner may be configured to determine at least one static object in the two or more previously captured images. Further, based on the two or more previously captured images, the dimensioner may determine reference dimensions of the at least one static object.

Further, the dimensioner may be configured to capture a first current image and a second current image using the first image capturing device and the second image capturing device, respectively. Based on the first current image and the second current image, the dimensioner may be configured to determine one or more updated dimensions of the at least one static object. Thereafter, the dimensioner may be configured to compare the one or more updated dimensions with the reference dimensions of the at least one static object to determine an error in the one or more updated dimensions. The dimensioner may determine whether the error is within a predefined dimension error range. If the determined error is not in the predefined dimension error range, the dimensioner may determine that the dimensioner is out of calibration. If the dimensioner determines that the determined error is within the predefined dimension error range, however, the dimensioner may determine that the calibration of the dimensioner remains intact.

In an instance in which the dimensioner determines that it is out calibration, the dimensioner may modify the one or more parameters. For example, the dimensioner may modify the correlation between the projector and the second image capturing device. Thereafter, the dimensioner may again (e.g., iteratively) determine the one or more updated dimensions of the at least one static object to determine whether the one or more updated dimensions of the at least one static object satisfy the predefined dimension error range. In some examples, the aforementioned process of modifying the one or more parameters and the determination of the one or more updated dimensions is repeated (e.g., iteratively) until the error in the one or more updated dimensions is within the predefined dimension error range (e.g., or zero indicating no error present). This automatic calibration (e.g., without any manual intervention) may improve the overall productivity of operations within a warehouse environment.

FIG. 1 illustrates an exemplary material handling environment 100, according to one or more embodiments described herein. The material handling environment 100 may refer to environments related to, but not limited to, manufacturing of the items, inventory storage of the items, packing and unpacking of the items, preparing customer orders, recording items related information based on scanning and identification of the items, and shipment processing (including shipping and logistics distribution of the items). In such environments, many workers perform different operations that may involve handling of items during various phases (including, but not limited to, accumulation, sortation, scanning and identification, packing, and shipment preparation etc.), of an overall operation cycle of the material handling environment 100. For example, the workers may be involved in manual packing and unpacking of the items while preparing customer orders for shipping. In another example, the workers may handle placing of the items in an accumulation zone of a conveyor system for automated packing of the items. In some environments, workers may use electronic devices like personal digital assistants (PDAs) or mobile devices connected to a headset and a server to receive automated or voice directed instructions for performing various operations including scanning and identification of labels (e.g., barcodes, RFID tags, etc.) affixed on the items for shipment preparation. As illustrated in FIG. 1, the material handling environment 100 includes a dimensioner 102, a network 130, and a computing device 132. The dimensioner 102 and the computing device 132 may be communicatively coupled with each other through the network 130.

Figure 7:
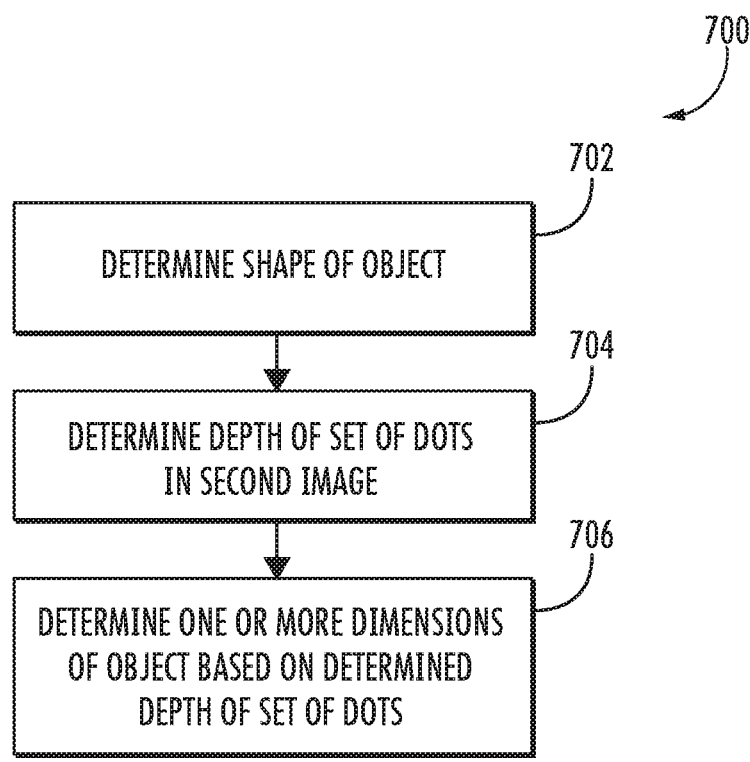
FIG. 7 illustrates a flowchart for determining one or more dimensions of an object, according to one or more embodiments described herein.

The dimensioner 102 may correspond to an electronic device that may be configured to determine one or more dimensions of one or more objects (e.g., the object 116), as is further described in conjunction with FIG. 7. In an example embodiment, the dimensioner 102 may include one or more image capturing devices such as a first image capturing device 104 and a second image capturing device 108. Further, the dimensioner 102 may include a projector 106. In an example embodiment, the first image capturing device 104, the second image capturing device 108, and the projector 106 may be positioned in a rig-type housing 110. In an example embodiment, the rig-type housing 110 may have a first end portion 112 and a second end portion 114. The first end portion 112 and the second end portion 114 may be spaced apart from each other along a longitudinal axis A-A' 115. In some examples, the first image capturing device 104 and the second image capturing device 108 are positioned proximate the second end portion 114, while the projector 106 is positioned proximate the first end portion 112. Further, the second image capturing device 108 may be positioned between the first image capturing device 104 and the projector 106. In some embodiments, a distance between the second image capturing device 108 and the projector 106 may be greater than a distance between the second image capturing device and the first image capturing device 104.

In some examples, the dimensioner 102 may utilize one or more of the first image capturing device 104, the second image capturing device 108, and the projector 106 to determine the one or more dimensions of an object 116, as is further described in conjunction with FIG. 7. In some examples, to enable the dimensioner 102 to determine the one or more dimensions of the object 116, the dimensioner 102 may be mounted on a stand 118 such that a platform 120 is within a field of view of the dimensioner 102. In an example embodiment, the field of view of the dimensioner 102 may correspond to the field of view of one or more of the projector 106, the first image capturing device 104, and the second image capturing device 108. In some examples, the field of view of the dimensioner 102 may correspond to a common field of view of the projector 106, the first image capturing device 106, and the second image capturing device 108. In some examples, for the dimensioner 102 to determine the one or more dimensions of the object 108, a human operator (e.g., the operator 122) may place the object 116 on the platform 120. Thereafter, the dimensioner 102 may determine the one or more dimensions of the object 116.

In addition to the platform 120, the field of view of the dimensioner 102 may further include objects, other than the platform 120, which may correspond to static objects and/or dynamic objects in the material handling environment 100. For example, the field of view of the dimensioner 102 includes the table 124 that may, in some embodiments, be a static object. The operation and the structure of the dimensioner 102 is further described in conjunction with FIG. 13.

The first image capturing device 104 in the dimensioner 102 may correspond to a camera device that is capable of generating an image based on light signals received from the common field of view of the first image capturing device 104. In some examples, the first image capturing device 104 may be configured to generate the image based on reception of light signals in the visible light spectrum. In an example embodiment, the light signal received by the first image capturing device 104 may correspond to a light generated by an illumination source on the dimensioner 102. In alternate embodiment, the illumination source may be external to the dimensioner 102. In yet another embodiment, the illumination source may be ambient light around the dimensioner 102. In an example embodiment, the first image capturing device 104 may further include a lens assembly (not shown) and a sensor assembly (not shown). The lens assembly may include one or more optical components such as one or more lenses, diffusers, wedges, reflectors or any combination thereof, for directing the light signal on the sensor assembly. In an example embodiment, the sensor assembly includes an image sensor, such as a color or monochrome 1D or 2D CCD, CMOS, NMOS, PMOS, CID or CMD solid state image sensor, that may be configured to generate the image based on the received light signal.

The projector 106 may correspond to an illumination source that may be configured to illuminate the one or more objects in the common field of view. As discussed above, the common field of view of the projector 106 may correspond to the field of view for both the first image capturing device 104 and the second image capturing device 108 such that the projector 106 is configured to illuminate the one or more objects within the field of view of both the first image capturing device 104 and the second image capturing device 108. To illuminate the one or more objects, the projector 106 may be configured to project light within the common field of view of the projector 106, the first image capturing device 104, and the second image capturing device 108. For example, the common field of view includes the object 116 and the static object 124, therefore, the projector 106 may project the light on the object 116 and the static object 124 to illuminate the object 116 and the static object 124. In some examples, the projector 106 may include a lens assembly that may facilitate the projection of the light on the one or more objects within the common field of view. The lens assembly may include one or more optical components such as one or more lenses, diffusers, wedges, reflectors, or any combination thereof that may facilitate the projection of the light. In some examples, the projector 106 may be configured to project a structured light (e.g., structured light pattern) on the one or more objects within the common field of view. In an example embodiment, the structured light may correspond to a predetermined light pattern that may be projected on the one or more objects within the common field of view. In some examples, the projected structured light may correspond to a light signal that is outside the visible light spectrum. For example, the projected structured light may be an infra-red (IR) light. Hereinafter the light projected by the projector 106 may interchangeably referred to as the structured light, structure light pattern, or the like.

In some example embodiments, the second image capturing device 108 may include similar features and elements as the first image capturing device 104. For example, the second image capturing device 108 may include a similar lens assembly as the lens assembly of the first image capturing device 104. In an example embodiment, the second image capturing device 108 may include an image sensor that is configured to detect the structured light (light projected by the projector 106). In some embodiments, the second image capturing device 108 may be configured to detect a reflected portion of the structured light. The reflected portion of the structured light may correspond to a portion of the structured light reflected from the one or more objects within the common field of view. Given that the structured light (projected by the projector 106) is a light signal outside of the visible spectrum, the image sensor of the second image capturing device 108 may be configured to detect the light signals in the same (or similar) light spectrum as that of the structured light. For example, the image sensor in the second image capturing device 108 may be configured to detect the Infra-Red (IR) light projected by the projector 106. In an example embodiment, the second image capturing device 108 may be configured to generate another image based on the detected structured light.

In an example embodiment, the first image capturing device 104, the second image capturing device 108, and the projector 106, may have a fixed focal length. Further, the focal length of each of the first image capturing device 104, the second image capturing device 108, and the projector 106 may be the same. In some other embodiments, one or more of the first image capturing device 104, the second image capturing device 108, and the projector 106 may have a fixed focal length. In other embodiments, one or more of the first image capturing device 104, the second image capturing device 108, and the projector 106 may have a variable focal length that may be modified manually or automatically.

In an example embodiment, the dimensioner 102 may determine the one or more dimensions of the object 116 based on a first image (captured by the first image capturing device 104) and a second image (captured by the second image capturing device 108), as is further described in conjunction with FIG. 7. Additionally or alternately, the dimensioner 102 may be configured to transmit the first image and the second image to a computing device 132, where the computing device 132 may be configured to determine the one or more dimensions of the object 116, as is further described in conjunction with FIG. 7.

In some alternative example embodiments, the dimensioner 102 may include a stereo camera assembly instead of the projector 106, the first image capturing device 104, and the second image capturing device 108. In such an alternative embodiment, the stereo camera assembly may include a third image capturing device and a fourth image capturing device that are positioned in the rig-type housing 110. In some examples, the third image capturing device and the fourth image capturing device may be similar to the first image capturing device 104. For the purpose of ongoing description, the dimensioner 102, as illustrated in FIG. 1, is referenced for explaining the various embodiments. However, those skilled in the art would appreciate that the disclosed embodiments are also applicable to other types of dimensioners without departing from the scope of the disclosure.

The network 130 may be any means such as a device or circuitry embodied in either hardware or a combination of hardware and software that is configured to receive and/or transmit data from/to various devices of the material handling environment 100 (e.g., the dimensioner 102 and the computing device 132). In this regard, the network 130 may include, for example, a network interface for enabling communications with a wired or wireless communication network. For example, the network 130 may include one or more network interface cards, antennae, buses, switches, routers, modems, and supporting hardware and/or software, or any other device suitable for enabling communications via a network. Additionally, or alternatively, the network 130 may include the circuitry for interacting with the antenna(s) to cause transmission of signals via the antenna(s) or to handle receipt of signals received via the antenna(s). Such signals may be transmitted using one or more communication protocols, such as Bluetooth® v1.0 through v3.0, Bluetooth Low Energy (BLE), infrared wireless (e.g., IrDA), ultra-wideband (UWB), induction wireless transmission, Wi-Fi, Near Field Communications (NFC), TCP/IP, UDP, 2G, 3G, 4G, 5G, Worldwide Interoperability for Microwave Access (WiMAX), or other proximity-based communications protocols.

The computing device 132 may include suitable logic and/or circuitry that may be configured to control the operation of the dimensioner 102. For example, the computing device 132 may utilize the dimensioner 102 to determine the one or more dimensions of the object 116, as is described in FIG. 7. In an example embodiment, the computing device 132 may be further configured to cause the dimensioner 102 to operate in one or more modes such as, but not limited to, a calibration mode, a self-calibration mode, and an operation mode. In some examples, the calibration mode may correspond to a mode in which the dimensioner 102 is calibrated manually, as is described later in conjunction with FIG. 4. In the self-calibration mode, the computing device 132 may cause the dimensioner 102 to calibrate automatically as is further described in FIG. 11. In an example embodiment, in both the calibration mode and the self-calibration mode, the computing device 132 may be configured to determine one or more parameters associated with the dimensioner 102 as is described in conjunction with FIG. 4. The one or more parameters of the dimensioner 102 may include, a correlation between the projector 106 and the second image capturing device 108, the focal length of the projector 106, the focal length of the first image capturing device 104, and/or the focal length of the second image capturing device 108. Further, in the operation mode, the computing device 132 may utilize the dimensioner 102 to determine the one or more dimensions of the object 116, as is described in conjunction with FIG. 7.

As described above, in some embodiments, the computing device 132 may be configured to determine the one or more dimensions of the object 116. However, the scope of the disclosure is not limited to the computing device 132 determining the one or more dimensions of the object 116. In alternate embodiments, the dimensioner 102 may directly determine the one or more dimensions of the object 116, without the requirement of the computing device 132. For the sake of clarity and consistency of description, the computing device 132 is described hereinafter as configured to determine the one or more dimensions of the object 116. As would be evidence to one of ordinary skill in the art in light of the present disclosure, various functionalities of the computing device 132 may also be implemented by the dimensioner 102.

Figure 2:
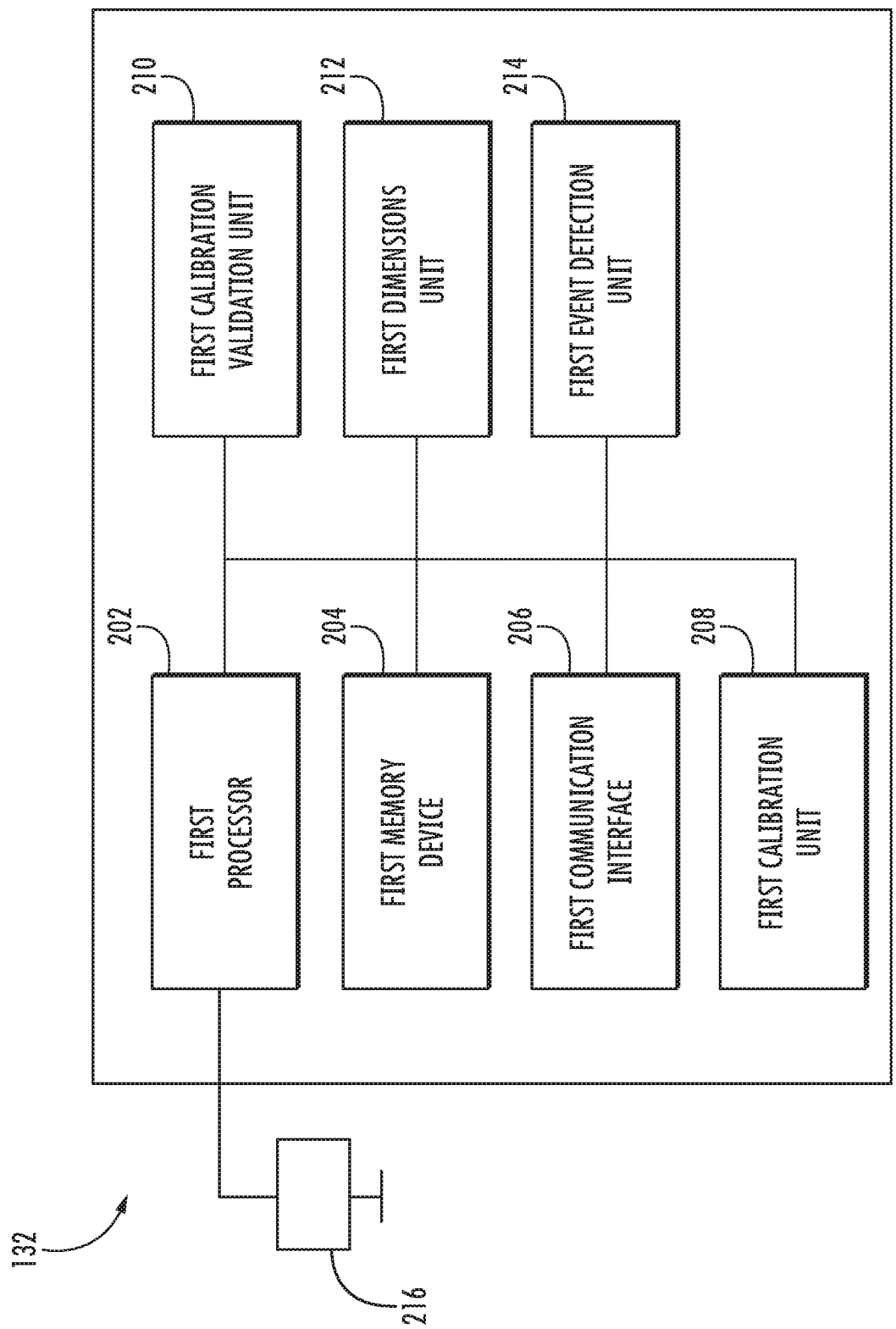
FIG. 2 illustrates a block diagram of a computing device, according to one or more embodiments described herein.

FIG. 2 illustrates a block diagram of the computing device 132, according to one or more embodiments described herein. The computing device 132 includes a first processor 202, a first memory device 204, a first communication interface 206, a first calibration unit 208, a first calibration validation unit 210, a first dimensioning unit 212, a first event detection unit 214, and a display screen 216.

The first processor 202 may be embodied as one or more microprocessors with accompanying digital signal processor(s), one or more processor(s) without an accompanying digital signal processor, one or more coprocessors, one or more multi-core processors, one or more controllers, processing circuitry, one or more computers, or various other processing elements including integrated circuits such as an application specific integrated circuit (ASIC), field programmable gate array (FPGA), or any combination thereof. Accordingly, although illustrated in FIG. 2 as a single processor, the processor 202 may include a plurality of processors and/or signal processing modules. The plurality of processors may be embodied on a single electronic device or may be distributed across a plurality of electronic devices collectively configured to function as the circuitry of the computing device 132. The plurality of processors may be in operative communication with each other and may be collectively configured to perform one or more functionalities of the circuitry of the computing device 132, as described herein. In an example embodiment, the first processor 202 may be configured to execute instructions stored in a first memory device 204 or otherwise accessible to the first processor 202. These instructions, when executed by the first processor 202, may cause the circuitry of the computing device 132 to perform one or more of the functionalities as described herein.

Whether configured by hardware, firmware/software methods, or by a combination thereof, the first processor 202 may include an entity capable of performing operations according to embodiments of the present disclosure while configured accordingly. Thus, for example, when the first processor 202 is embodied as an ASIC, FPGA, or the like, the first processor 202 may include specifically configured hardware for conducting one or more operations described herein. Alternatively, as another example, when the first processor 202 is embodied as an executor of instructions, such as may be stored in the first memory device 204, the instructions may specifically configure the first processor 202 to perform one or more algorithms and operations described herein.

Thus, the first processor 202 used herein may refer to a programmable microprocessor, microcomputer, or multiple processor chip(s) that may be configured by software instructions (e.g., applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The first memory device 204 may include suitable logic, circuitry, and/or interfaces that are adapted to store a set of instructions that is executable by the first processor 202 to perform predetermined operations. Some of the commonly known memory implementations include, but are not limited to, a hard disk, random access memory, cache memory, read only memory (ROM), erasable programmable read-only memory (EPROM) electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the first memory device 204 may be integrated with the first processor 202 on a single chip, without departing from the scope of the disclosure.

The first communication interface 206 may correspond to a communication interface that may facilitate transmission and reception of messages and data to and from the computing device 132. For example, the first communication interface 206 may be communicatively coupled, to transmit/receive data, with the dimensioner 102. Examples of the first communication interface 206 may include, but are not limited to, an antenna, an Ethernet port, a USB port, a serial port, or any other port that can be adapted to receive and transmit data. The first communication interface 206 transmits and receives data and/or messages in accordance with the various communication protocols, such as, I2C, TCP/IP, UDP, and 2G, 3G, 4G, or 5G communication protocols.

Figure 4:
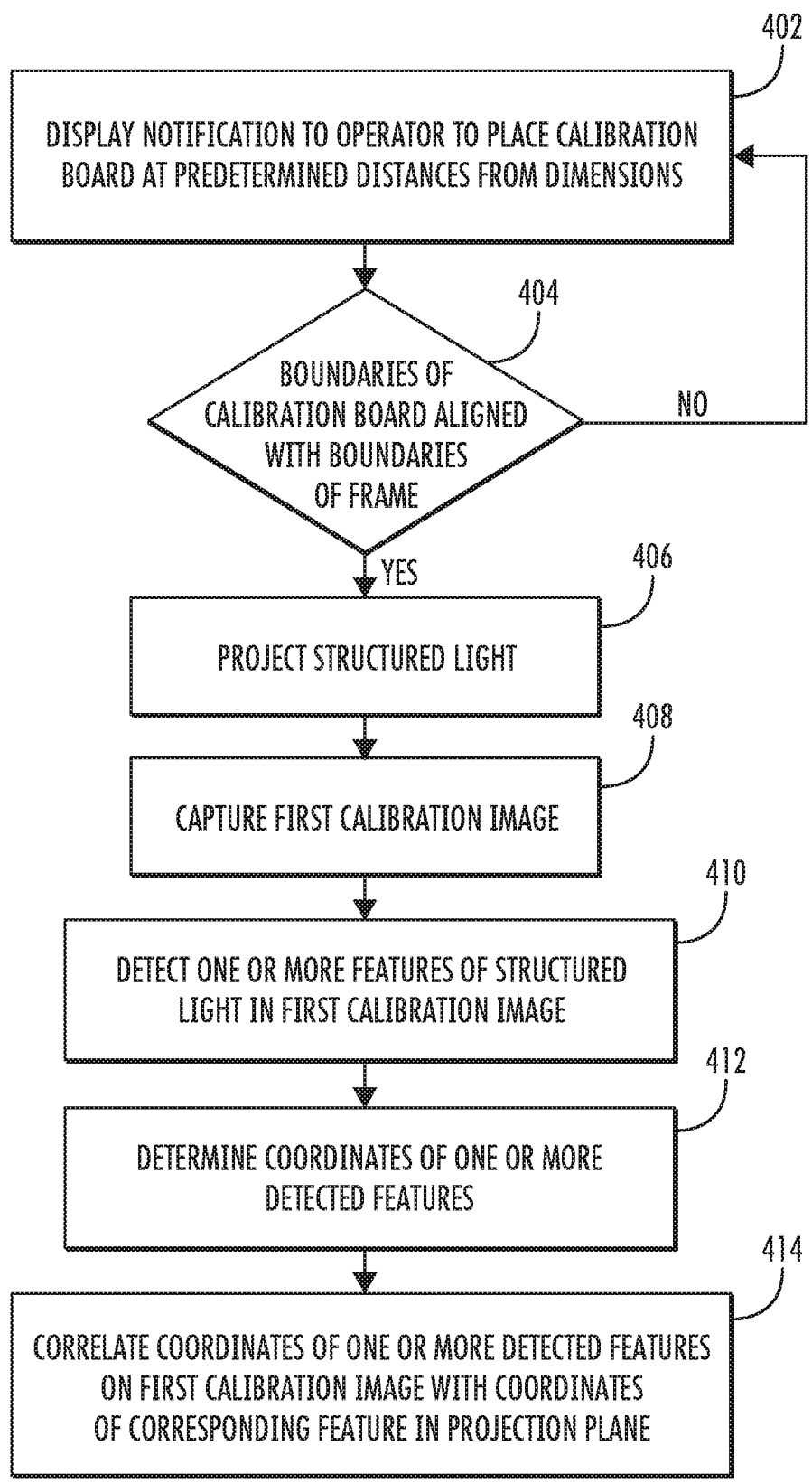
FIG. 4 illustrates a flowchart of a method for operating a dimensioner in a calibration mode, according to one or more embodiments described herein.

The first calibration unit 208 may include suitable logic and/or circuitry for operating the dimensioner 102 in the calibration mode, as is further described in conjunction with FIG. 4. In the calibration mode, the first calibration unit 208 may be configured to determine a measure of the one or more parameters associated with the dimensioner 102, as is further described in FIG. 4. For example, the first calibration unit 208 may be configured to determine the correlation between the projector 106 and the second image capturing device 108 during the calibration mode. In some examples, where the focal length of the first image capturing device 104, the focal length of the projector 106, and the focal length of the second image capturing device 108 are not fixed, the first calibration unit 208 may be configured to determine the focal length of the projector 106, the focal length of the first image capturing device 104, and the focal length of the second image capturing device 108, as is further described in FIG. 12. The first calibration unit 410 may be implemented using one or more technologies, such as, but not limited to, FPGA, ASIC, and the like.

Figure 10:
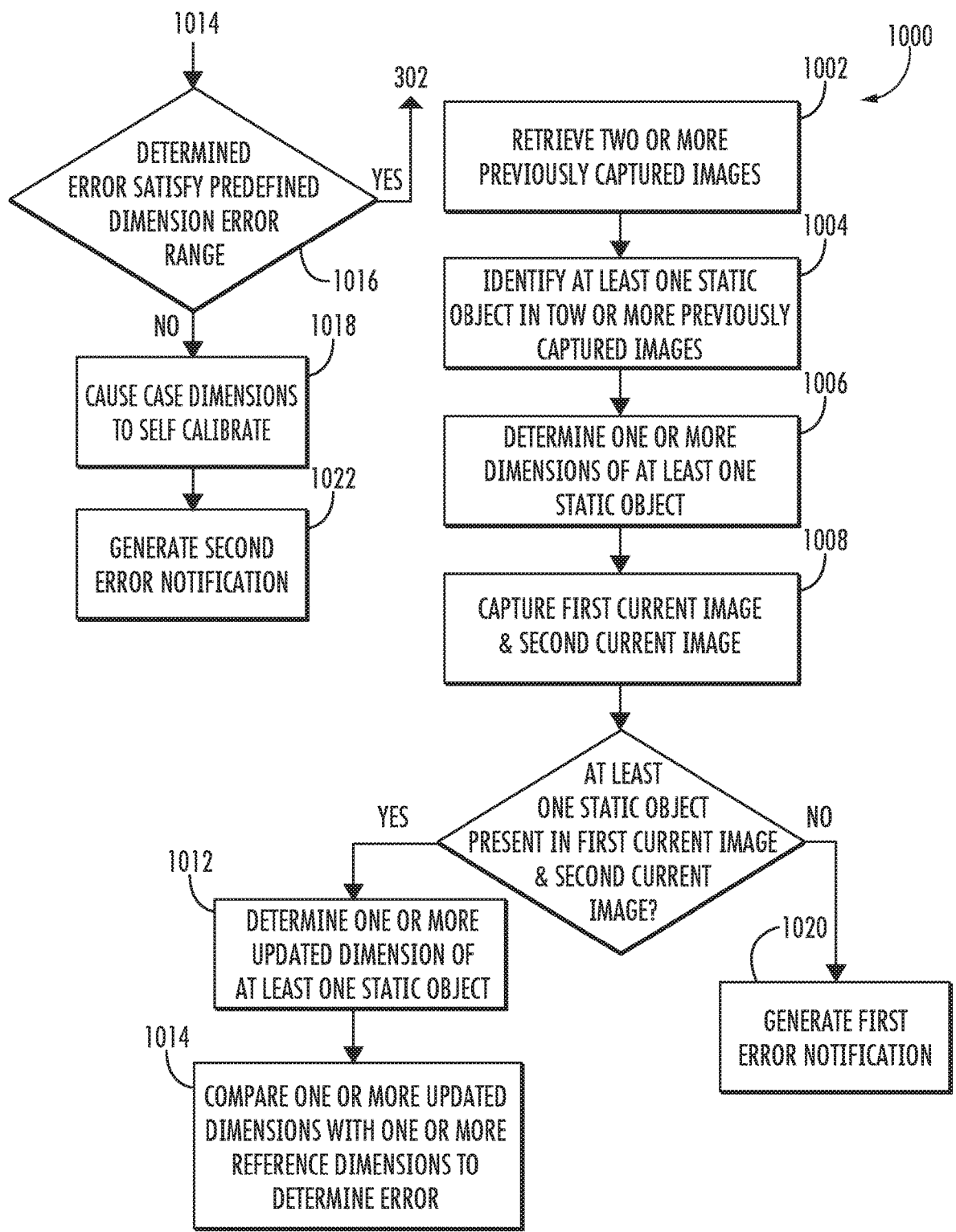
FIG. 10 illustrates a flowchart of a method for operating a dimensioner in a self-calibration mode, according to one or more embodiments described herein.

The first calibration validation unit 210 may include suitable logic and/or circuitry to determine whether the dimensioner 102 (i.e., the measure of the one or more parameters) is out of calibration, as is further described in conjunction with FIG. 10. The first calibration validation unit 210 may be implemented using one or more technologies, such as, but not limited to, FPGA, ASIC, and the like.

The first dimensioning unit 212 may include suitable logic and/or circuitry to determine the one or more dimensions of an object (e.g., the object 116), as is further described in FIG. 7. For example, to determine the one or more dimensions of the object 116, the first dimensioning unit 212 may cause the dimensioner 102 to capture an image of the object 116 using the first image capturing device 104. Further, the first dimensioning unit 212 may cause the dimensioner 102 to capture another image of the object 116 using the second image capturing device 108. Thereafter, based on the first image, the second image, and the one or more parameters associated with the dimensioner 102, the first dimensioning unit 212 may determine the one or more dimensions of the object 116. The first dimensioning unit 212 may be implemented using one or more technologies, such as, but not limited to, FPGA, ASIC, and the like.

Figure 9:
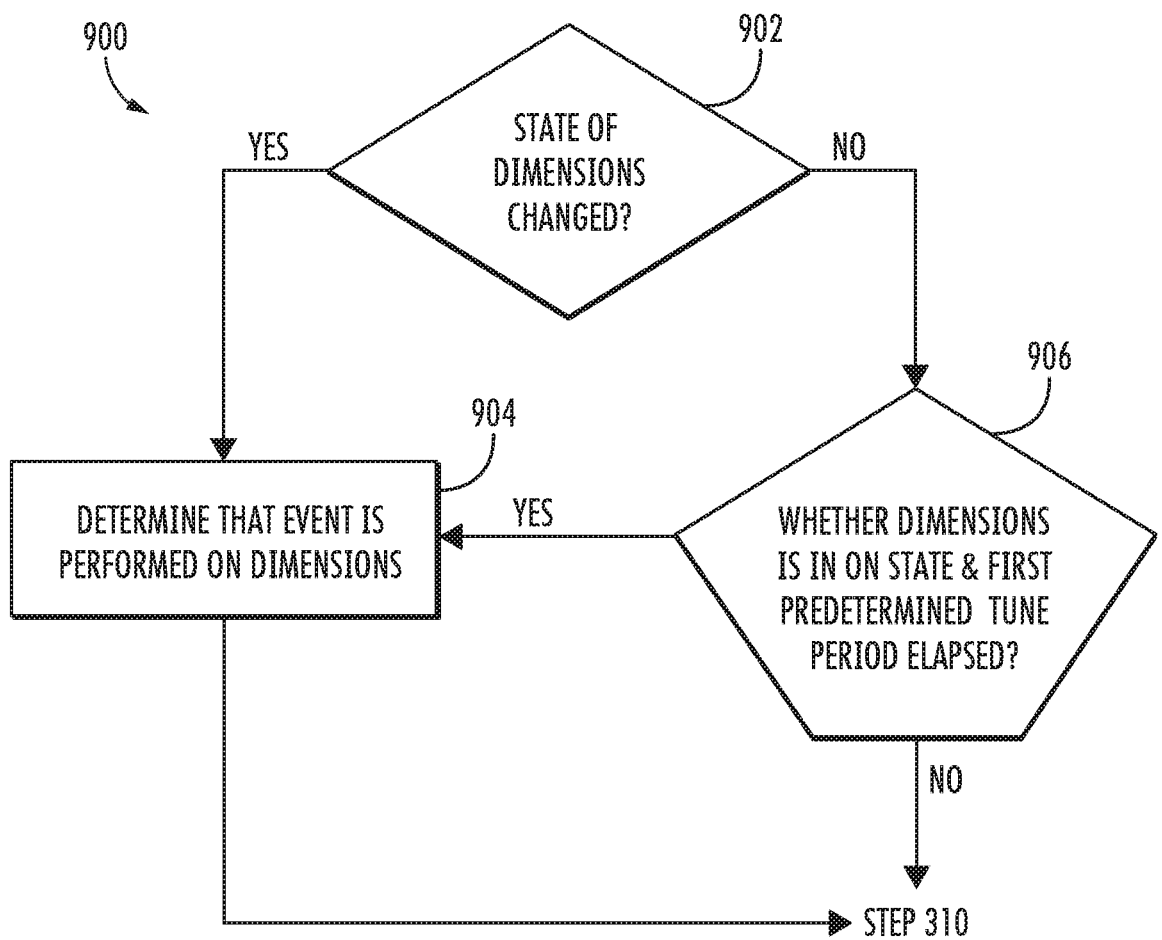
FIG. 9 illustrates a flowchart of a method for detecting an event on a dimensioner, according to one or more embodiments described herein.

The first event detection unit 214 may include suitable logic and/or circuitry to detect an event on the dimensioner 102, as is further described in conjunction with FIG. 9. In an example embodiment, the event may correspond to at least one of elapsing of a first predetermined time period, initiating the determination of the one or more dimensions of an object (e.g., the object 116), or powering on the dimensioner 102. The first event detection unit 214 may be implemented using one or more technologies, such as, but not limited to, FPGA, ASIC, and the like.

The display screen 216 may include suitable logic, circuitry, interfaces, and/or code that may be operable to render a display. In an example embodiment, the display screen 216 may be realized through several known technologies such as, Cathode Ray Tube (CRT) based display, Liquid Crystal Display (LCD), Light Emitting Diode (LED) based display, Organic LED display technology, and/or Retina display technology. In some example embodiments, the display screen 216 may be configured to display one or more messages/notifications. In some embodiments, the display screen 216 may include a touch panel, such as a capacitive touch panel, a thermal touch panel, and/or resistive touch panel, that may enable the worker to provide inputs to the computing device 132.

FIGS. 3, 4, 6, 7, and 9-12 illustrate example flowcharts of the operations performed by an apparatus, such as the dimensioner 102 and the computing device 132 of FIG. 1 in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3, 4, 6, 7, and 9-12, when executed, convert a computer or processing circuitry into a particular machine configured to perform an example embodiment of the present invention. Accordingly, the operations of FIGS. 3, 4, 6, 7, and 9-12 define an algorithm for configuring a computer or processor, to perform an example embodiment. In some cases, a general purpose computer may be provided with an instance of the processor which performs the algorithm of FIGS. 3, 4, 6, 7, and 9-12 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

Figure 3:
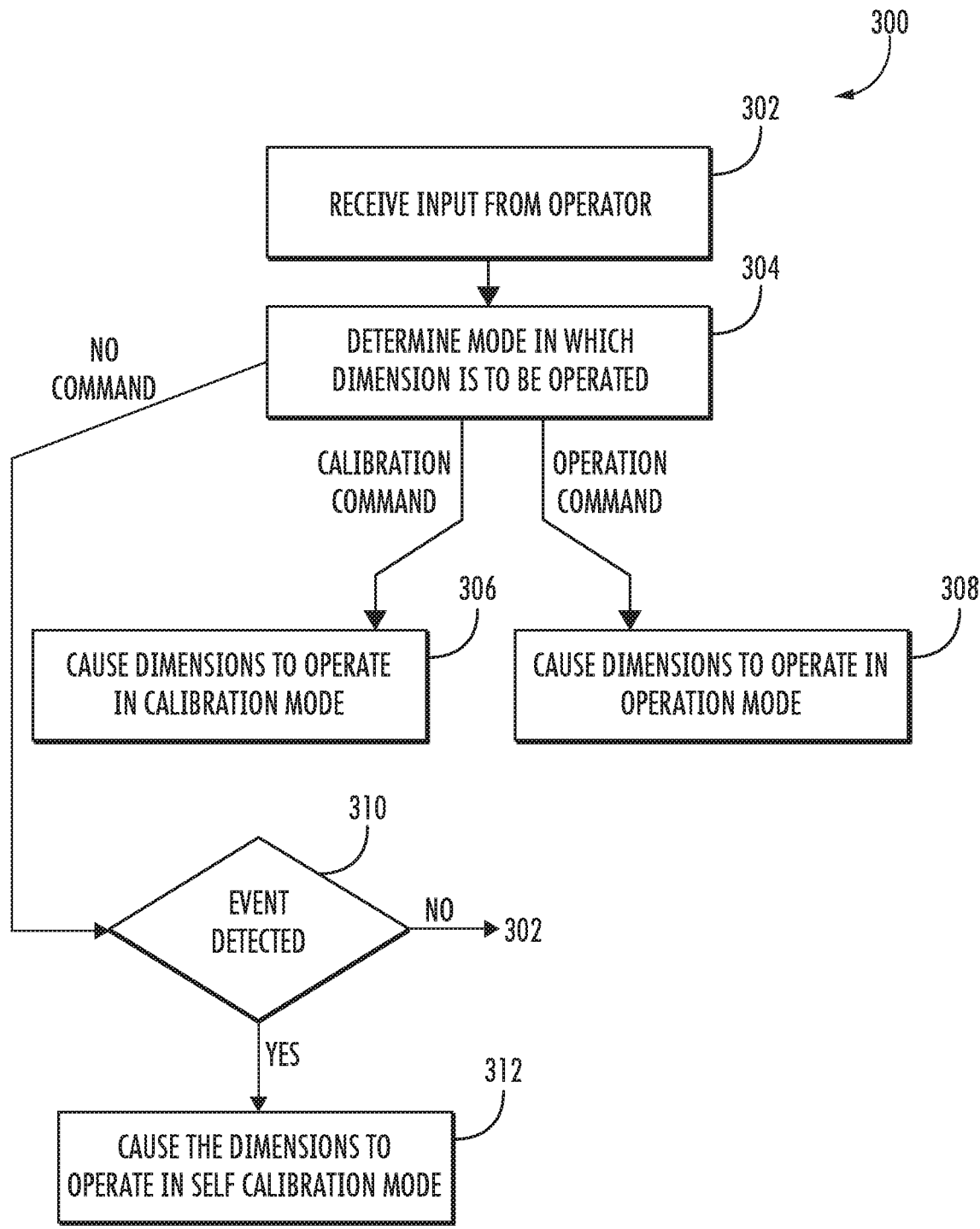
FIG. 3 illustrates a flowchart of a method for operating a dimensioner, according to one or more embodiments described herein.

FIG. 3 illustrates a flowchart 300 of a method for operating the dimensioner 102, according to one or more embodiments described herein. In some examples, the flowchart 300 may be performed by the computing device 132.

At step 302, the computing device 132 includes means such as, the first processor 202, and/or the like, for receiving an input from the operator 122 of the dimensioner 102. In an example embodiment, the input may correspond to a command or an instruction to operate the dimensioner 102 in a mode of the one or more modes. As described above, the one or more modes may include, but are not limited to, the calibration mode, the self-calibration mode, and the operation mode.

At step 304, the computing device 132 includes means such as, the first processor 202, and/or the like, for determining the mode in which the processor 202 may operate the dimensioner 102 based on the received command. If the processor 202 determines that the received command corresponds to operating the dimensioner 202 in the calibration mode, the processor 202 may be configured to perform the step 306.

At step 306, the computing device 132 includes means such as, the first processor 202, and/or the like, for causing the dimensioner 202 to operate in the calibration mode. The operation of the dimensioner 102 in the calibration mode is described in conjunction with FIG. 4.

FIG. 4 illustrates a flowchart 400 of a method for operating the dimensioner 102 in the calibration mode, according to one or more embodiments described herein.

At step 402, the computing device 132 includes means such as, the first processor 202, the display screen 216, the first calibration unit 208, and/or the like, for displaying a notification to the operator 122, on the display screen 216, requesting that the operator 122 place a calibration board at a predetermined distance from the dimensioner 102. In an example embodiment, the calibration board may correspond to an image, which may be used to calibrate the dimensioner 102. In an example embodiment, the predetermined distance may correspond to a distance at which the calibration board is located to calibrate the dimensioner 102. In some examples, the predetermined distance may be pre-stored in the dimensioner 102 or in the computing device 132, without departing from the scope of the disclosure. To assist the operator 122 in placing the calibration board at the predetermined distance, the first calibration unit 202 may cause the first image capturing device 104 to capture a video stream of the common field of view and cause the dimensioner 102 to transmit the captured video stream to the computing device 132. On receiving the video stream, the first calibration unit 202 may instruct the display screen 216 to display a frame (such as a rectangular box) on the display screen 216. Further, the first calibration unit 202 may instruct the display screen 216 to overlay the received video stream on the displayed frame. Given that the operator 122 may place the calibration board in the common field of view of the dimensioner 102, the video stream captured by the first image capturing device 104 may include the calibration board. Further, when the first calibration unit 202 causes the display screen 216 to display the video stream along with the frame, the video stream displayed on the display screen 216 includes the calibration board. Any change in the position of the calibration board may cause the position of the calibration board in the video stream to change as well.

Thereafter, the first calibration unit 202 may instruct the operator 122 (by means of displaying the notification to the operator 122 on the display screen 216) to position the calibration board in such a manner that the boundaries of the calibration board in the video stream align with the boundaries of the frame displayed on the display screen 216. In some example embodiments, the size of the frame displayed on the display screen 216 may correspond to a scale of an object when the object is placed at the predetermined distance (at which the dimensioner 102 is to be calibrated) of the dimensioner 102. Therefore, when the boundaries of the calibration board, in the video stream, align with the boundaries of the frame, the calibration board is said to be placed at the predetermined distance from the dimensioner 102.

At step 404, the computing device 132 includes means such as, the first processor 202, the display screen 216, the first calibration unit 208, and/or the like, for determining whether boundaries of the calibration board are aligned with the boundaries of the frame (as displayed on the display screen 216). In some examples, the first calibration unit 208 may be configured to utilize one or more image processing techniques such as edge detection and/or Scale Invariant Feature Transform (SIFT) to determine whether the boundaries of the frame align with the boundaries of the calibration board. For instance, the first calibration unit 208 may identify edges of the calibration board. Thereafter, the first calibration unit 208 may be configured to determine coordinates of the edges of the calibration board in the video stream and compare the coordinates of the edges of the calibration board in the video stream with the coordinates of the frame displayed in the display screen 216. Based on the comparison, the first calibration unit 208 may determine whether the boundaries of the calibration board align with the boundaries of the frame. If the first calibration unit 208 determine that the boundaries of the calibration board are not aligned with the boundaries of the frame, the first calibration unit 202 may be configured to repeat the step at 402. If the first calibration unit 208 determines that the boundaries of the calibration board are aligned with the boundaries of the frame, however, the first calibration unit 208 may be configured to perform the step at 406. The alignment of the calibration board with the frame is further illustrated in conjunction with FIG. 5.

At step 406, the computing device 132 includes means such as, the first processor 202, the first calibration unit 208, and/or the like, for causing the projector 106 to project the structured light in the common field of view. In an example embodiment, the first calibration unit 208 may transmit an instruction to the projector 106 to project the structured light in the common field of view. As discussed above, the structured light corresponds to the predetermined light pattern that is formed of one or more features such as, but not limited to, a plurality of barcode type stripes, a checkered board pattern, a plurality of dots, and/or the like. In an example embodiment, each of the one or more features is uniquely identifiable by the first calibration unit 208. For example, the first calibration unit 208 may be configured to uniquely identify each dot of the plurality of dots (corresponding to the unique feature of the structured light) included in the structured light projected by the projector 106 using one or more image processing techniques (e.g., SIFT). In another example, each dot of the plurality of dots may be uniquely coded (e.g., a numeral, distance between neighboring dots, and/or the like) based on which the first calibration unit 208 may uniquely identify each dot of the plurality of dots. Further, the first calibration unit 208 knows the coordinates of each of the plurality of dots, in a projection plane, projected by the projector 106. In an example embodiment, the projection plane corresponds to a virtual image plane that is utilized to define position of content projected by a projector (e.g., the projector 106). Further, the projector plane may be utilized to define the coordinates of the features (e.g., the plurality of dots) of the structured light projected by the projector 106.

At step 408, the computing device 132 includes means such as, the first processor 202, the first calibration unit 208, and/or the like, for causing the second image capturing device 108 to capture a first calibration image of the common field of view of the second image capturing device 108. In an example embodiment, the first calibration unit 208 may be configured to transmit an instruction, corresponding to causing the second image capturing device to capture the first calibration image, to the dimensioner 102. On receiving the instruction, the second image capturing device 102 captures the first calibration image.

As discussed above, that second image capturing device 108 and the projector 106 may operate in the same light spectrum (e.g., both the second image capturing device 108 and the projector 106 operate in IR light spectrum), therefore, the second image capturing device 108 may capture the projected structured light (e.g., projected by the projector 106). Therefore, the first calibration image, captured by the second image capturing device 108, includes an image of the projected structure light (e.g., the image of the plurality of dots). After capturing of the first calibration image, the first calibration unit 208 may be configured to receive the first calibration image from the dimensioner 102.

At step 410, the computing device 132 includes means such as, the first processor 202, the first calibration unit 208, and/or the like, for detecting the one or more features of the structured light in the first calibration image. In an example embodiment, the first calibration unit 208 may be configured to detect the one or more feature (e.g., the plurality of dots) of the structured light based on one or more image processing techniques such as, but not limited to, SIFT.

At step 412 the computing device 132 includes means such as, the first processor 202, the first calibration unit 208, and/or the like, for determining coordinates of the one or more detected features in the first calibration image. Thereafter, at step 414, the computing device 132 includes means such as, the first processor 202, the first calibration unit 208, and/or the like, for correlating the coordinates of the one or more detected feature in the first calibration image with the coordinates of the corresponding feature in the projection plane. As discussed above, the first calibration unit 208 may uniquely identify the one or more features of the structured light in the projection plane, and, therefore, the first calibration unit 208 may map the coordinates of the one or more detected feature in the first calibration image with the coordinates of the corresponding feature in the projection plane. Table 1 shown below illustrates an example mapping of the coordinates of the one or more detected features in the second calibration image and the corresponding feature in the projection plane:

TABLE 1

Mapping between the coordinates of the one or more features in the projection plane and the first calibration image

| One or more features | Coordinates of a feature in projection plane | Coordinates of a feature in first calibration image |
|---|---|---|
| Dot -1 | (1, 1) | (4, 5) |
| Dot -2 | (2, 2) | (6, 3) |

For example "dot-1" in structured light has a coordinate (1,1) in the projection plane, while the "dot-1" has the coordinate (4,5) in the first calibration image. Additionally or alternately, the first calibration unit 208 may be configured to determine the mapping between the coordinates of the detected feature in the first calibration image with the coordinates of the corresponding feature in the projection plane based on following equation:

$$x_i^c = x_i^p + \frac{fw}{Z_0} \quad (1)$$

Where,
$x_i^c$: Coordinate of a feature in the first calibration image;
$x_i^p$: Coordinate of corresponding feature in the projection plane;
f: focal length of second image capturing device 108;
w: distance between the projector 106 and the second image capturing device 108; and
$Z_0$: the predetermined distance.

In some example embodiments, other calibration techniques may also be used to calibrate the dimensioner 102. For example, based on the coordinates of the one or more detected features in the first calibration image, the first calibration unit 208 may tune a fundamental matrix. In such an example embodiment, the fundamental matrix may correspond to a matrix that defines a correlation between the coordinates of the one or more features in the first calibration image and the coordinates of the one or more features in the projection plane.

Figure 5:
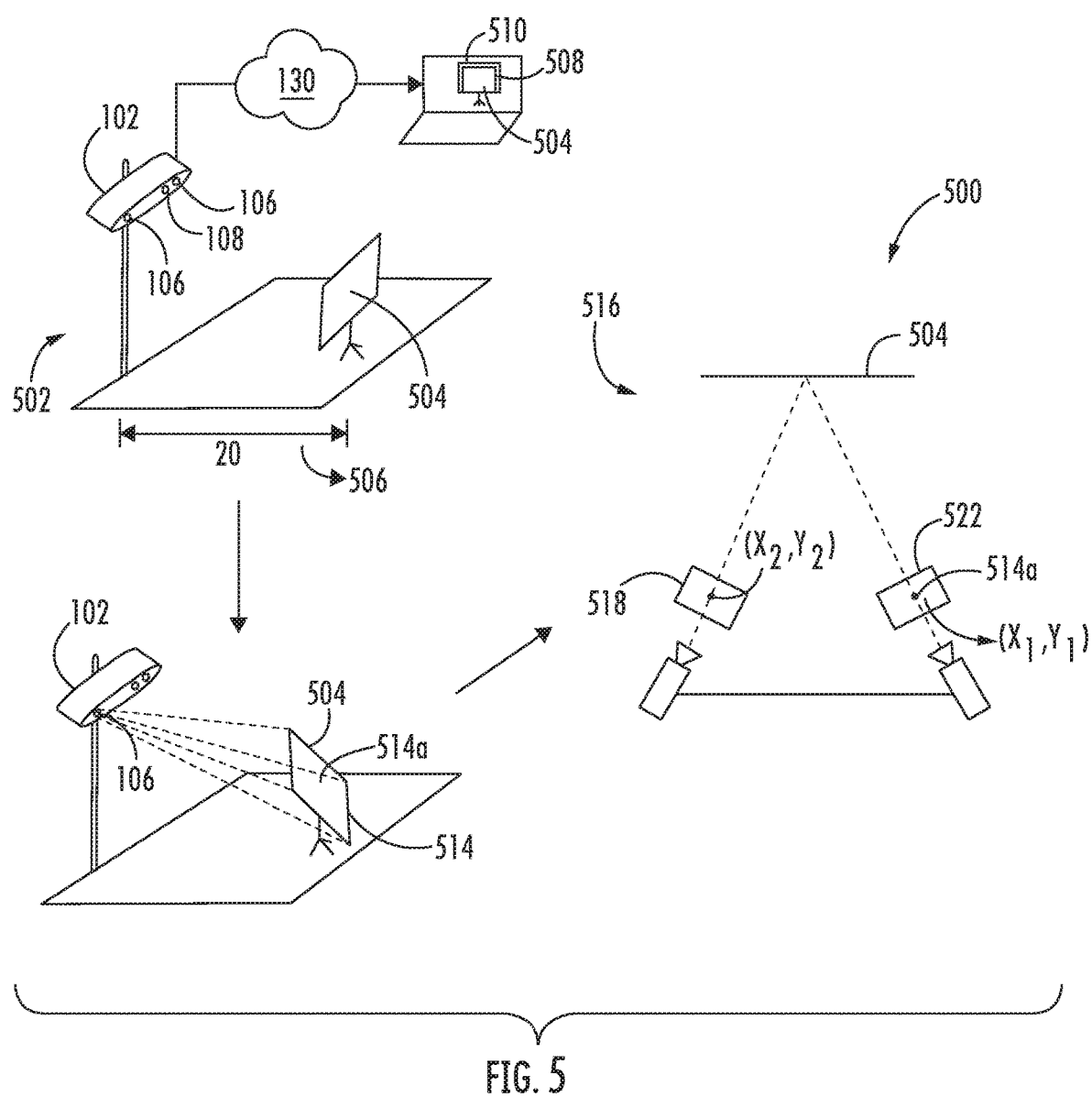
FIG. 5 illustrates a calibration of a dimensioner, according to one or more embodiments described herein.

FIG. 5 illustrates an example scenario 500 illustrating the calibration of the dimensioner 102, according to one or more embodiments described herein. The example scenario 500 depicts a series of illustrations predicting various phases of the calibration of the dimensioner 102. For example, the illustration 502 depicts that a calibration board 504 is placed at the predetermined distance $Z_0$ (e.g., 506) from the dimensioner 102. Further, the illustration 502 depicts that the display screen 216 of the computing device 132 displays the frame 508 and the image of the calibration board 504 (e.g., 510). The boundary of the image 510 of the calibration board 504 aligns with the boundary of the frame 508.

The illustration 512 depicts that the projector 106 projects the structured light in the common field of view of the dimensioner 102, which includes the calibration board 504. Therefore, from the illustration 512, it can be observed that the structured light is projected on the calibration board 504. Further, it can be observed that the structured light includes the plurality of dots (e.g., 514).

The illustration 516 depicts capturing of the first calibration image (e.g., 518) by the second image capturing device 108. It can be observed that the first calibration image 518 depicts the structured light projected by the projector 106. Further, illustration 516 depicts the correlation between the structured light captured in the first calibration image 518 and the structured light in the projection plane (e.g., 522). For example, the dot 514a having coordinates $(x_1,y_1)$ in the projection plane (e.g., 522) has coordinates $(x_2,y_2)$ in the first calibration image. In some examples, the relation between the coordinates $(x_1,y_1)$ and the coordinates $(x_2,y_2)$ is determined by equation 1.

After the calibration of the dimensioner 102, the operator 122 of the dimensioner 102 may place the object 116 on the platform 120 and may cause the dimensioner 102 to determine the one or more dimensions of the object 116. For example, after placing the object 116 on the platform 120, the operator 122 may provide a command to operate the dimensioner 102 in the operation mode. In the operation mode, the computing device 132 may use the dimensioner 102 to determine the one or more dimensions of the object 116, as is further described in the FIG. 6.

Referring back to the 304, if the processor 202 determines that the received command corresponds to operating the dimensioner 102 in the operation mode, the first processor 202 may be configured to perform the step 308. At step 308, the computing device 132 includes means such as, the first processor 202, the first dimensioning unit 208, and/or the like, for causing the dimensioner 102 to operate in the operation mode, as is further described in conjunction with FIG. 6.

Figure 6:
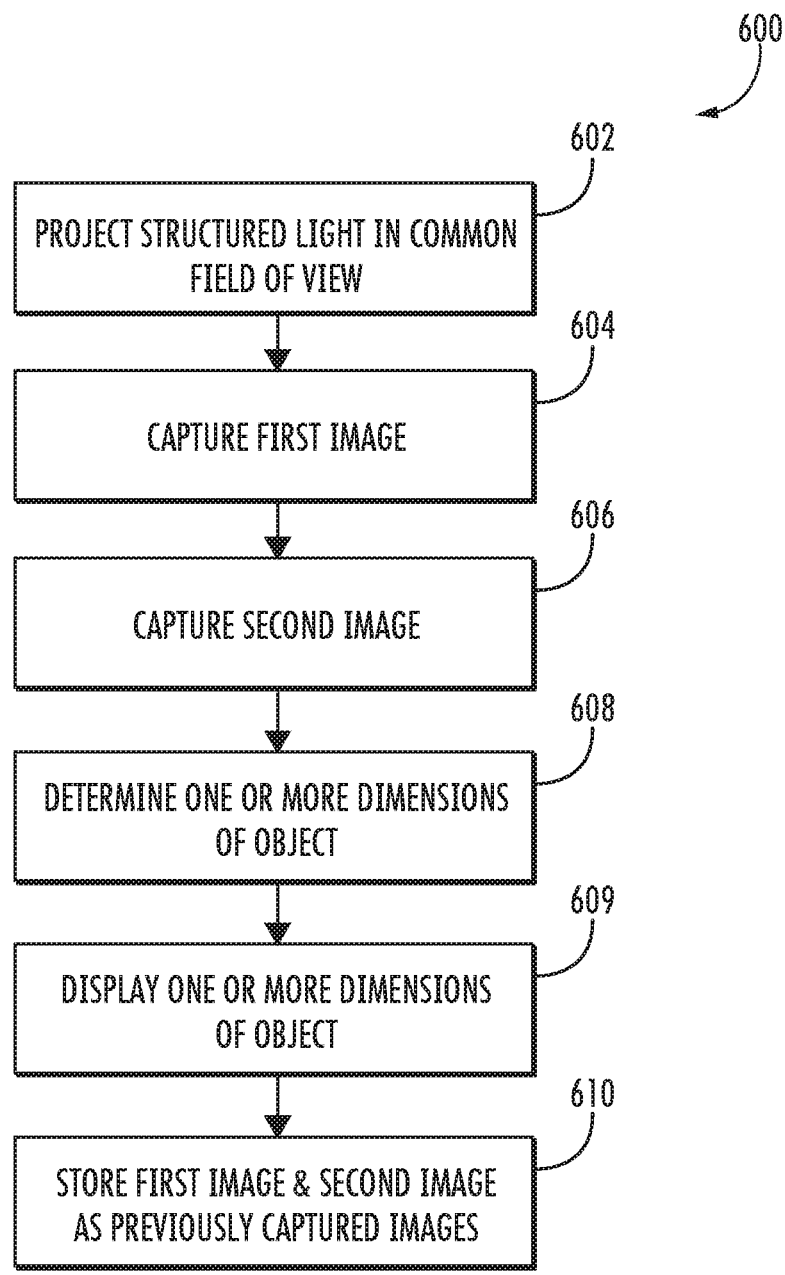
FIG. 6 illustrates a flowchart for operating a dimensioner in an operation mode, according to one or more embodiments described herein.

FIG. 6 illustrates a flowchart 600 for operating the dimensioner 102 in the operation mode, according to one or more embodiments described herein. At step 602, the computing device 132 includes means such as, the first processor 202, the first dimensioning unit 212, and/or the like, for causing the projector 106 to project the structured light in the common field of view of the dimensioner 102. Since the platform 120 is within the common field of view (i.e., also the field of the projector 106) of the dimensioner 102, the projector 106 projects the structured light on the platform 120. As discussed above, prior to providing the command to operate the dimensioner 102 in the operation mode, the operator 122 may have placed the object 116 on the platform 120. Therefore, when the projector 106 projects the structured light in the common field of view, which includes the platform 120, the structured light is also projected on the object 116.

At step 604, the computing device 132 includes means such as, the first processor 202, the first dimensioning unit 208, and/or the like, for causing the first image capturing device 104 to capture a first image of the common field of view of the dimensioner 102. In an example embodiment, since the first image capturing device 104, the second image capturing device 108, and the projector 106 have a common field of view and the common field of view includes the object 116 placed on the platform 120, when the first image capturing device 104 captures the first image of the common field of view, the first image includes the object 116. In some example embodiments, the first image may further include other objects that are present in the common field of view. For example, the first image may include the image of the table 124 (i.e., the at least one static object). In an example embodiment, the first dimensioning unit 208 may be configured to store the first image in the first memory device 204.

At step 606, the computing device 132 includes means such as, the first processor 202, the first dimensioning unit 208, and/or the like, for causing the second image capturing device 108 to capture a second image of the common field of view. As discussed, in some example embodiments, the second image capturing device 108 and the projector 106 operate in the same light spectrum, therefore, the second image capturing device 108 is capable of capturing the structured light, projected by the projector 106z on the object 116 (e.g., on the platform 120). For example, the second image captured by the second image capturing device 108 may illustrate the plurality of dots (i.e., the structured light).

At step 608, the computing device 132 includes means such as, the first processor 202, the first dimensioning unit 208, and/or the like, for determining the one or more dimensions of the object 116 based on the first image, the second image, and the one or more parameters associated with the dimensioner 102. The determination of the one or more dimensions of the object 116 is further described in conjunction with FIG. 7.

FIG. 7 illustrates a flowchart 700 for determining the one or more dimensions of the object 116, according to one or more embodiments described herein. At step 702, the computing device 132 includes means such as, the first processor 202, the first dimensioning unit 208, and/or the like, for determining a shape of the object 116. In an example embodiment, the first dimensioning unit 212 may be configured to utilize one or more image processing techniques such as, edge detection and/or SIFT, to determine the shape of the object 116. For example, the first dimensioning unit 208 may be configured to identify the edges of the object 116 in the first image (i.e., captured by the first image capturing device 104). Thereafter, the first dimensioning unit 208 may be configured to determine one or more features of the object 116 based on the detected edges of the object 116. In some examples, the one or more features of the object 116 may include, but are not limited to, corners of the object 116, edges of the object 116, and/or the like. Subsequently, based on the one or more features of the object 116, the first dimensioning unit 208 may be configured to determine the shape of the object (e.g., by comparing the one or more determined features of the object 116 with features of known shapes).

After determining the shape of the object 116 using the first image, the first dimensioning unit 208 may be configured to identify a set of dots of the plurality of dots in the second image, (e.g., projected as the structured light by the projector 106) that is encompassed by the determined shape of the object 116. For example, the set of dots may be positioned in the second image such that the set of dots may be indicative of the shape of the object 116.

At step 704, the computing device 132 includes means such as, the first processor 202, the first dimensioning unit 212, and/or the like, for determining a depth of the set of the dots in the second image. To determine the depth of the set of the dots, the first dimensioning unit 212 may be configured to identify each dot in the set of dots. As discussed above, the computing device 132 may uniquely identify each dot in the plurality of dots (e.g., based on unique codes assigned to each dot of the plurality of dots), such that the first dimensioning unit 212 may identify each dot in the set of dots (corresponding to the object 116) based on their respective unique codes. Further, the first dimensioning unit 212 may be configured to determine the coordinates of the set of dots in the second image. Thereafter, the first dimensioning unit 212 may be configured to determine a disparity in the coordinates of the set of dots in the second image from the coordinates of the set of dots in the first calibration image (captured by the second image capturing device 108 during calibration operation). In an example embodiment, the disparity in the coordinates of a dot corresponds to a measure of a change in the coordinates of the dot from the coordinates in the first calibration image. In some examples, when the object 116 is placed on the platform 120, the set of dots (corresponding to the dots that are projected on the object 116) is incident on the object 116 instead of the platform 120. Therefore, the position of the set of dots in the second image will change from the position of the set of dots in the second calibration image (in which no object is present in the common field of view).

Based on the measure of disparity, the first dimensioning unit 212 may determine the depth of the dot from the dimensioner 102 using the following equation:

$$Z_i = \frac{fw}{\frac{fw}{Z_0} + d_i} \qquad (2)$$

Where,
$Z_i$: Depth of the dot i; and
$d_i$: Disparity measure of the dot i.
The determination of the depth of the dot i has is illustrated in FIG. 8.

Figure 8:
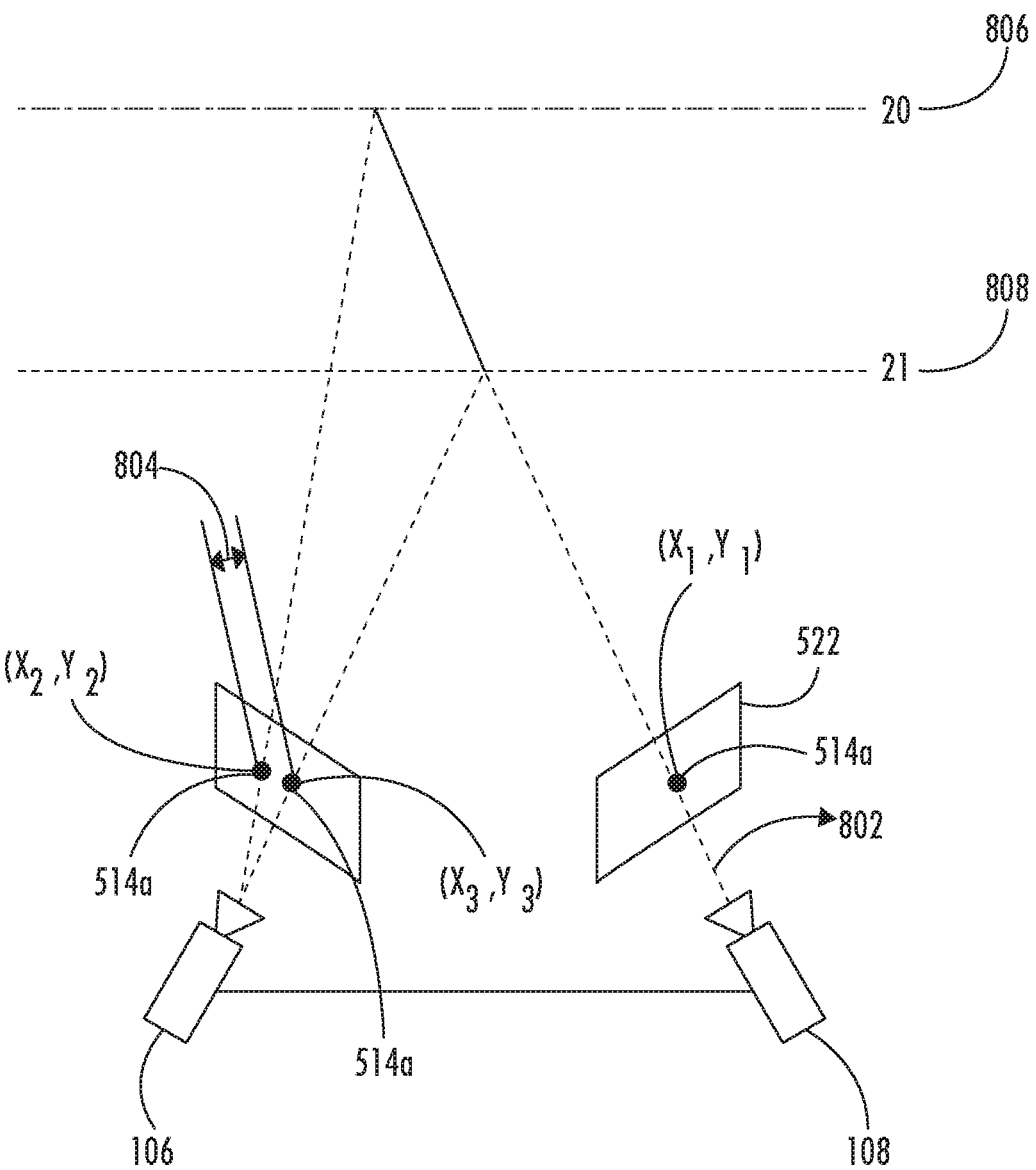
FIG. 8 illustrates a ray diagram depicting determination of a depth of a dot, according to one or more embodiments described herein.

FIG. 8 illustrates a ray diagram 800 depicting the determination of the depth of the dot, according to one or more embodiments described herein. The ray diagram 800 illustrates the projection of the dot (e.g., 514a) on the projection plane 522 by a light ray 802 projected by the projector 106. During the calibration of the dimensioner 102, the light ray is reflected from the calibration board 504, which is positioned at the predetermined distance $Z_0$ (e.g., 806). The reflected light ray is received by the second image capturing device 108. Based on the reception of the reflected light ray, the second image capturing device 108 generates the first calibration image in which the dot 514a has a coordinate (x2, y2).

When the object 116 placed on the platform 120, the distance of the object 116 from the dimensioner 102 is less than the predetermined distance $Z_0$ (e.g., 806). Therefore, the light ray 802 corresponding to the dot 514a is reflected from the surface of the object 116, which is at a distance $Z_1$ (e.g., 808), from the dimensioner 102. Due the change in the position of the reflection point of the light ray 802 corresponding to the dot 514a, the coordinates of the dot 514a in the second image (captured during operation mode) changes to (x3,y3) from the coordinates (x2,y2). The distance between the coordinates (x3,y3) in the second image and the coordinates (x2,y2) in the first calibration image corresponds to the disparity measure (e.g., 804). Thereafter, the first dimensioning unit 212 determines the distance $Z_1$ (e.g., 808) based on the disparity measure using the equation 2.

After determining the depth of the set of dots in the second image, at step 706, the computing device 132 includes means such as, the first processor 202, the first dimensioning unit 212, and/or the like, for determining the one or more dimensions of the object 116 based on the determined depth of the set of dots. In an example embodiment, the first dimensioning unit 212 may utilize one or more mathematical and geometrical formulations to determine the one or more dimensions of the object 116. For example, the first dimensioning unit 212 may subtract the determined depth of two dots, in the set of dots that are positioned along a z-axis of the object 116, to determine a width of the object. Similarly, the first dimensioning unit 212 may determine one or more other dimensions of the object 116.

In some example embodiments, the scope of the disclosure is not limited to determining the one or more dimensions based on the method described in the flowchart 700. In an alternate embodiment, the processor 202 may determine the one or more dimensions of the object 116 based on a variation in intensity of the pixels in the first image. In some examples, the intensity of the pixels may vary based on a depth of the corresponding point (represented by the pixel) from the dimensioner 102. Therefore, based on the variation of the intensity of the pixel, the first dimensioning unit 212 may be configured to determine the depth of the object 116 from the dimensioner 102. Accordingly, based on the depth, the dimensioner 102 may be configured to determine the one or more dimensions of the objects 116. After determining the one or more dimensions of the object 116, the dimensioner 102 may be configured to transmit the one or more dimensions to the computing device 132.

Referring back to the FIG. 6, at step 609, the computing device 132 includes means such as, the first processor 202, the first dimensioning unit 212, and/or the like, for displaying the one or more dimensions of the object 116 on the display screen 216. Further, at step 610, the computing device 132 includes means such as, the first processor 202, the first dimensioning unit 212, and/or the like, for storing the first image and the second image in the first memory device 204 as previously captured images.

Referring back to FIG. 3, at step 304, if the processor 202 determines that no command is received from the operator 122 of the dimensioner 102, the processor 202 may be configured to perform the step 310. At step 310, the computing device 132 includes means such as, the first processor 202, the event detection unit 214, and/or the like, for determining whether an event is detected on the dimensioner 102. The detection of the event on the dimensioner 102 is further described in conjunction with FIG. 9.

FIG. 9 illustrates a flowchart 900 of a method for detecting an event on the dimensioner 102, according to one or more embodiments described herein. At step 902, the computing device 132 includes means such as, the first processor 202, the event detection unit 214, and/or the like, for determining whether a state of the dimensioner 102 has changed. In an example embodiment, the state of the dimensioner 102 may correspond to powering (e.g., switching, turning, etc.) the dimensioner ON or powering (e.g., switching, turning, etc.) the dimensioner OFF. In some examples, the event detection unit 214 may receive the state information from the dimensioner 102 through the network 130. If the event detection unit 214 determines that the state of the dimensioner 102 has changed, the event detection unit 214 may be configured to perform the step at 904. At step 904, the computing device 132 includes means such as, the first processor 202, the event detection unit 214, and/or the like, for determining that the event has been performed on the dimensioner 102. Thereafter, the event detection unit 214 may be configured to perform the step 310.

However, if the event detection unit 214, at step 902, determines that no state of the dimensioner 102 has changed, the event detection unit 214 may be configured to perform the step 906. At step 906, the computing device 132 includes means such as, the first processor 202, the event detection unit 214, and/or the like, for determining whether the dimensioner 102 is operating in the ON state and whether a first predetermined time period has elapsed. In an example embodiment, the first predetermined time period may correspond to a time period elapsed since the dimensioner 102 operated in the calibration mode or in the self-calibration mode. If the event detection unit 214 determines that the first predetermined time period has elapsed, the event detection unit 214 may be configured to perform the step 904. If the event detection unit 214 determines that the first predetermined time period has not elapsed, the event detection unit 214 may be configured to perform the step 310.

In some example embodiments, the scope of the disclosure is not limited to the events detected in the flowchart 900. Additionally or alternately, the event may correspond to reception of the command to operate the dimensioner 102 in the operation mode 102. In such an example embodiment, the event detection unit 214 may be configured to determine that the event has been performed on the dimensioner 102.

Referring back to the step 310, if the event detection unit 214 determines that the event has been detected, the processor 202 may be configured to perform the step 312. However, if the event detection unit 214 determines that the event has not been detected, the processor 202 may be configured to repeat the step 302.

At step 312, the computing device 132 includes means such as, the first processor 202, the first calibration unit 208, and/or the like, for causing the dimensioner to operate in the self-calibration mode. The operation of the dimensioner 102 in the self-calibration mode is described in conjunction with FIG. 10.

FIG. 10 illustrates a flowchart 1000 of a method for operating the dimensioner 102 in the self-calibration mode, according to one or more embodiments described herein. At step 1002, the computing device 132 includes means such as, the first processor 202, the first calibration unit 208, and/or the like, for retrieving two or more previously captured images of the common field of view. As discussed above, during the operation of the dimensioner 102 in the operation mode, the first image and the second image captured by the first image capturing device 104 and the second image capturing device 108, respectively, are stored in the first memory device 204 as the previously captured images. Accordingly, at step 1002, the first calibration unit 208 may be configured to retrieve two or more previously captured images from the first memory device 204.

At step 1004, the computing device 132 includes means such as, the first processor 202, the first calibration unit 208, and/or the like, for identifying at least one static object in the two or more previously captured images. In an example embodiment, to identify the at least one static object, the first calibration unit 208 may be configured to subtract the two or more previously captured images amongst each other in order to generate a subtracted image. The subtracted image may only include dynamic objects. As discussed above, the dynamic objects correspond to objects that may change their respective locations with time (e.g., operator 122). Thereafter, using the subtracted image and the two or more previously captured images, the first calibration unit 208 may be configured to identify the at least one static object. For instance, from the subtracted image the first calibration unit 208 may be configured to determine the location of the dynamic objects in the two or more previously captured images. Thereafter, the first calibration unit 208 may be configured to remove the dynamic objects from the two or more previously captured images based on the location of the dynamic objects. After the removal of the dynamic objects, the two or more previously captured images may include the at least one static object (e.g., the table 124).

At step 1006, the computing device 132 includes means such as, the first processor 202, the first dimensioning unit 212, and/or the like, for determining the one or more dimensions of the at least one static object (e.g., the table 124). In an example embodiment, the first dimensioning unit 212 may be configured to determine the one or more dimensions of the at least one static object (e.g., the table 124) based on the two or more previously captured images using the methodology described in the flowchart 700. Further, the first dimensioning unit 212 may be configured to store the one or more determined dimensions of the at least one static object (e.g., the table 124) in the first memory device 204 as the one or more reference dimensions.

At step 1008, the computing device 132 includes means such as, the first processor 202, the first calibration unit 208, and/or the like, for causing the dimensioner 102 to capture a first current image and a second current image of the at least one static object (e.g., the table 124) using the first image capturing device 104 and the second image capturing device 108, respectively. Thereafter, at step 1010, the computing device 132 includes means such as, the first processor 202, the first calibration unit 208, and/or the like, for comparing the first current image and the second current image with the two or more previously captured images to determine whether the at least one static object (e.g., the table 124) is present in the common field of view of the dimensioner 102. In an example embodiment, the first calibration unit 208 may be configured to subtract the first current image from the two or more previously captured images to generate another subtracted image. Thereafter, the first calibration unit 208 determines whether the other subtracted image includes the at least one static object (e.g., the table 124). If the first calibration unit 208 determines that the at least one static object (e.g., the table 124) is present in the other subtracted image, the first calibration unit 208 may determine that the at least one static object (e.g., the table 124) is not present in the first current image. Accordingly, the first calibration unit 208 may be configured to perform the step 1020. However, if the first calibration unit 208 determines that the other subtracted image does not include the at least one static object (e.g., the table 124), the first calibration unit 208 determines that the at least one static object is present in the first current image and the second current image. Accordingly, the first calibration unit 208 may be configured to perform the step 1012.

At step 1012, the computing device 132 includes means such as, the first processor 202, the first dimensioning unit 212, and/or the like, for determining one or more updated dimensions of the at least one static object (e.g., the table 124) using the methodologies described in the flowchart 700.

At step 1014, the computing device 132 includes means such as, the first processor 202, the first calibration unit 208, and/or the like, for comparing the one or more updated dimensions of the at least one static object (e.g., the table 124), determined in the step 1012, with the one or more reference dimensions (determined in the step 1006) of the at least one static object to determine an error in the one or more updated dimensions. By way of example, the reference length (i.e., the reference one or more dimensions) of the at least one static object may be 10 mm. Further, the updated length (i.e., the one or more updated dimensions) of the at least one static object may 13 mm. In such an example, the first calibration unit 208 may determine the error as 3 mm.

At step 1016, the computing device 132 includes means such as, the first processor 202, the first calibration unit 208, and/or the like, for determining whether the determined error in the one or more updated dimensions satisfy a predefined dimension error range. For example, the first calibration unit 208 determines whether the determined error is within the predefined dimension error range. For example, if the predefined dimension error range is 0 mm-1 mm and the determined error in the one or more updated dimensions is 3 mm, the first calibration unit 208 may determine that the one or more updated dimensions of the at least one static object (e.g., the table 124) does not satisfy the predefined dimension error range. Accordingly, if the first calibration unit 208 determines that the determined error does not satisfy the predefined dimension error range, the first calibration unit 208 may be configured to perform the step 1018. If the first calibration unit 208 determines that the determined error satisfy the predefined dimension error range, the first calibration unit 208 may configured to repeat the step 302.

In some examples, if the first calibration unit 208 determines that the determined error does not satisfy the predefined dimension error range, the first calibration unit 208 may determine that the dimensioner 102 is out of calibration. Said differently, the one or more parameters determined during the calibration of the dimensioner 102 may no longer be utilized to determine the one or more dimensions of the object 116. In some example embodiments, the one or more dimensions of the object 116 determined using the one or more outdated parameters may result in the determination of incorrect dimensions of the object 116.

In some examples, the dimensioner 102 may be out of calibration due many reasons such as variation in the ambient temperature around the dimensioner 102. As discussed above, the projector 106 and the second image capturing device 108 may operate in the IR light spectrum. Therefore, any change in the temperature of the ambient temperature of the dimensioner 102 may modify the structured light projected by the projector 106 and/or the reflected structured light detected by the second image capturing device 108. For instance, the position of the plurality of dots projected by the projector 106 may shift due to a change in the temperature of the ambient temperature of the dimensioner 102. The shifting of the plurality of dots may cause a different set of dots to be projected on the object 116. The projection of different set of dots on the object 116 may cause the first calibration unit 208 to determine an incorrect depth of the different set of dots, which may further lead to an incorrect determination of the one or more dimensions of the object 116.

In some examples, the dimensioner 106 may be out of calibration due to various other reasons, for example, an orientation of the dimensioner 102 may be modified due to a loose coupling of the dimensioner 102 and the stand 118. In an instance in which the orientation of the dimensioner 102 is modified from a position at which the dimensioner 102 was initially calibrated, the plurality of dots projected by the projector 106 may be shifted based on the change in the orientation of the dimensioner 102. The shifting of the plurality of dots may cause the first calibration unit 208 to determine an incorrect depth of the plurality of dots, which may further lead to an incorrect determination of the one or more dimensions of the object 116.

At step 1018, the computing device 132 includes means such as, the first processor 202, the first calibration unit 208, and/or the like, for causing the dimensioner 102 to self-calibrate. The self-calibration of the dimensioner 102 is described below in conjunction with FIG. 11.

Referring back to the step 1010, if the first calibration unit 208 determines that the at least one static object (e.g., the table 124) is present in the other subtracted image, the first calibration unit 208 may determine that the at least one static object (e.g., the table 124) is not present in the first current image. Accordingly, the first calibration unit 208 may determine that either the position of the dimensioner 102 or the orientation of the dimensioner 102 has been modified. Consequently, the first calibration unit 208 may be configured to perform the step 1020.

In some examples, the scope of the disclosure is not limited to the determining whether the orientation of the dimensioner 102 is modified based on the other subtracted image. In an alternative embodiment, the dimensioner 102 may include one or more orientation sensors such as a gyroscope and/or an accelerometer through which the first calibration unit 208 may be configured to monitor whether the orientation of the dimensioner 102 has modified. In such an embodiment, the first calibration unit 208 may be configured to cause the one or more orientation sensors to determine a current measure of the orientation of the dimensioner 102. Thereafter, the first calibration unit 208 may be configured to determine whether the current orientation of the dimensioner 102 has exceeded a predetermined orientation threshold. In an instance in which the current measure of the orientation exceeds the predetermined orientation threshold, the first calibration unit 208 may be configured to determine that the orientation of the dimensioner 102 has been modified and may accordingly perform the step 1020.

At step 1020 the computing device 132 includes means such as, the first processor 202, the first calibration unit 208, and/or the like, for generating a first error notification indicative of the change in orientation/position of the dimensioner 102. In an example embodiment, the first calibration unit 208 may be configured to display the first error notification on the display screen 216. In some examples, the first error notification may include an instruction for the operator 122 to calibrate the dimensioner 102 manually (as is described in the flowchart 400). Thereafter, the processor 202 may be configured to repeat the step 302.

In some examples, the scope of the disclosure is not limited to the generating the first error notification when the orientation/position of the dimensioner 102 is modified. In an alternative embodiment, when the at least one static object (e.g., table 124) is not present in the first current image, the first calibration unit 208 may be configured to repeat the steps 1002 and 1004 to identify a new static object. Thereafter, the method described in the flowchart 1000 is repeated. Additionally or alternatively, the first calibration unit 208 may be configured to create an error log that may include information pertaining to either a change in the position or orientation of the dimensioner 102 and/or removal of the at least one static object (e.g., table 124) from the field of view of the dimensioner 102.

Figure 11:
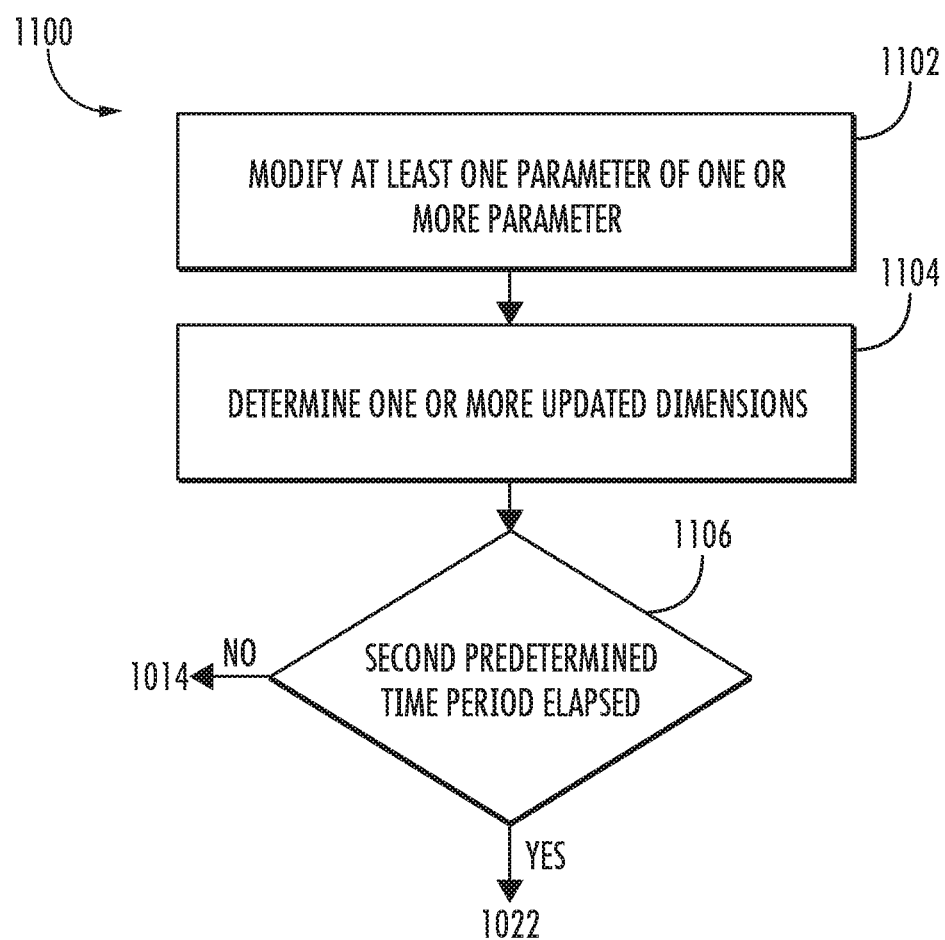
FIG. 11 illustrates a flowchart of a method for self-calibrating a dimensioner, according to one or more embodiments described herein.

FIG. 11 illustrates a flowchart 1100 of another method for self-calibrating the dimensioner 102, according to one or more embodiments described herein. At step 1102, the computing device 132 includes means such as, the first processor 202, the first calibration unit 208, and/or the like, for modifying at least one parameter of the one or more parameters. As discussed above, in some example embodiments, the focal length of the first image capturing device 104, the second image capturing device 108, and the projector 106 may be same and may remain constant. Therefore, during self-calibration of the dimensioner 102, the first calibration unit 208 may be configured to modify the correlation between the second image capturing device 108 and the projector 106. Further, as discussed above, the correlation between the projector 106 and the second image capturing device 108 corresponds to the mapping between the coordinates of the plurality of dots in the projection plane and the coordinates of the plurality of dots in the first calibration image. Further, the correlation is mathematically defined by the equation 1, as illustrated above.

As discussed above, when the dimensioner 102 is out of calibration (due to variations in the temperature of the ambient around the dimensioner 102 or change in the orientation of the dimensioner 102), the structured light projected by the projector 106 may be shifted (e.g., the coordinates of the plurality of dots may be shifted in the projection plane). However, as discussed, the shifting of the structured light is not reflected in the plurality of dots represented in the first calibration image captured and stored during the operation of the dimensioner 102 in the calibration mode. Therefore, to correct the correlation between the projector 106 and the second image capturing device 108, the first calibration unit 208 may be configured to modify the coordinates of the plurality of dots in the first calibration image. In an example embodiment, the first calibration unit 208 may be configured to modify the coordinates of the plurality of dots based on the determined error (determined in the step 1014).

For example, the first calibration unit 208 may be configured to generate a correction value by which the first calibration unit 208 may shift the coordinates of the plurality of dots in the first calibration image. In some examples, the first calibration unit 208 may be configured to utilize a proportional, integral, and derivative (PID) controller (in the first calibration unit 208) to determine the correction value based on the determined error. In other examples, the first calibration unit 208 may utilize a fuzzy controller and/or a neural network based controller to determine the correction value based on the determined error.

After determining the correction value, the first calibration unit 208 may be configured to modify the coordinates of the plurality of dots by the determined correction value. For instance, the coordinates of the dot in the first calibration image are (1,2) and the determined correction value is 1, the first calibration unit 208 may be configured to modify the coordinates of the dot to (2,3).

At step 1104, the computing device 132 includes means such as, the first processor 202, the first calibration unit 208, and/or the like, for determining the one or more updated dimensions of the at least one static object (e.g., the table 124) based on the one or more modified parameters of the dimensioner 102. In an example embodiment, the first calibration unit 208 may be configured to use methodologies described in the flowchart 700 to determine the one or more updated dimensions of the at least one static object (e.g., the table 124).

At step 1106, the computing device 132 includes means such as, the first processor 202, the first calibration unit 208, and/or the like, for determining whether a second predetermined time period has elapsed. In an example embodiment, the second predetermined time period may correspond to a time duration for which the first calibration unit 208 may cause the dimensioner 102 to recalibrate. If the second predetermined time period has not elapsed, the first calibration unit 208 may be configured to repeat the step 1014 at which the one or more updated dimensions are compared with the one or more reference dimensions to determine the error in the one or more updated dimensions. If the first calibration unit 208 determines that the determined error satisfy the predefined dimension error range, the first calibration unit 208 may determine that dimensioner 102 has been re-calibrated. Thereafter, the first dimensioning unit 212 may utilize the one or more modified parameters to determine the one or more dimensions of the object 116. If the first calibration unit 208 determines that the determined error does not satisfy the predefined dimension error range, the first calibration unit 208 may be configured to repeat the flowchart 1100 until the determined error in the one or more updated dimensions of the at least one static object (e.g., the table 124) is satisfy the predefined dimension error range or until the second predetermined time period elapses.

If the first calibration unit 208 determines that the second predetermined time period has elapsed, the first calibration unit 208 may be configured to perform the step 1022. Referring back to FIG. 10, at step 1022, the computing device 132 includes means such as, the first processor 202, the first calibration unit 208, and/or the like, for generating a second error notification indicative of a calibration error. In an example embodiment, the first calibration unit 208 may be configured to display the second error notification on the display screen 216. In alternate embodiment, the first calibration unit 208 may be configured to generate an audio signal corresponding to the second error notification. In some examples, the scope of the disclosure is not limited to only displaying the second error notification on the computing device 132. In alternate embodiment, the first calibration unit 208 may be configured to transmit the second error notification to the dimensioner 102, where the dimensioner 102 may activate an LED (not shown) on the rig-type housing 110.

In some examples, the scope of the disclosure is not limited to the only modifying the correlation between the projector 106 and the second image capturing device 108 to re-calibrate the dimensioner 102. In alternate embodiment, the first calibration unit 208 may be configured to modify other parameters of the one or more parameters to re-calibrate the dimensioner 102. One such method of recalibrating the dimensioner 102 is described in conjunction with FIG. 12.

Figure 12:
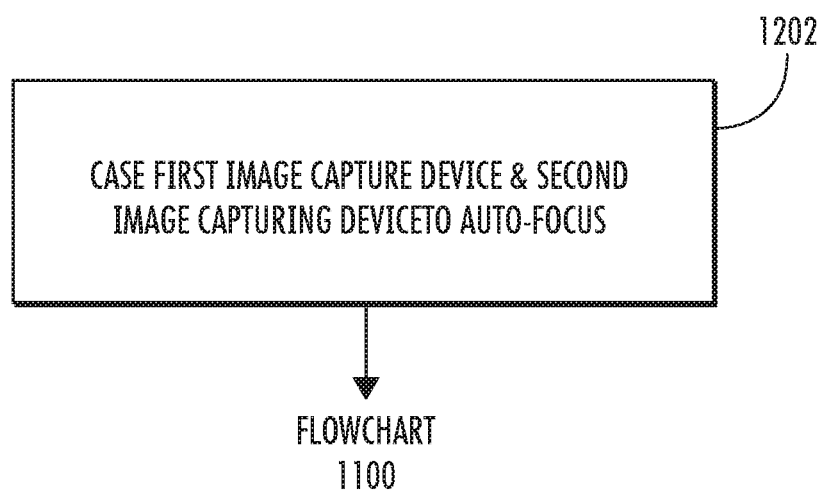
FIG. 12 illustrates a flowchart of another method for self-calibrating a dimensioner, according to one or more embodiments described herein.

FIG. 12 illustrates a flowchart 1200 of a method for self-calibrating the dimensioner 102, according to one or more embodiments described herein. At step 1202, the computing device 132 includes means such as, the first processor 202, the first calibration unit 208, and/or the like, for causing first image capturing device 104 and the second image capturing device 108 to auto-focus. In an example embodiment, the first calibration unit 208 may cause the first image capturing device 104 and the second image capturing device 108 to focus on the platform 120. Additionally or alternately, the first calibration unit 208 may cause the first image capturing device 104 and the second image capturing device 108 to focus on the object 116 and/or the at least one static object (e.g., the table 124). Further, the first calibration unit 208 may be configured to store the updated focal length (i.e., the focal length after the auto focus operation is performed) of first image capturing device 104 and the second image capturing device 108 in the first memory device 204. Thereafter, the first calibration unit 208 may be configured to perform the operation described in the flowchart 1100 to modify the correlation between the projector 106 and the second image capturing device 108.

In an example embodiment, the first calibration unit 208 continues to iteratively modify the one or more parameters associated with the dimensioner 102 until the one or more updated dimensions of the at least one static object is within the predefined dimension error range. Once the one or more updated dimensions of the at least one static object is within the predefined dimension error range, the dimensioner 102 is determined to be calibrated. Therefore, the computing device 132 causes the dimensioner 102 to automatically detect whether the dimensioner 102 is out of calibration, automatically re-calibrate the dimensioner 102 without manual intervention, and, therefore, improve the overall productivity of operations in the material handling environment 100.

In some examples, the scope of the disclosure is not limited to the computing device 132 causing the dimensioner 102 to calibrate and determine the one or more dimensions of the object 116. In an alternate embodiment, the functionalities of the computing device 132 may be implemented in whole or in part by the dimensioner 102. In such an embodiment, the dimensioner 102 may have a structure, as is described in conjunction with FIG. 13.

Figure 13:
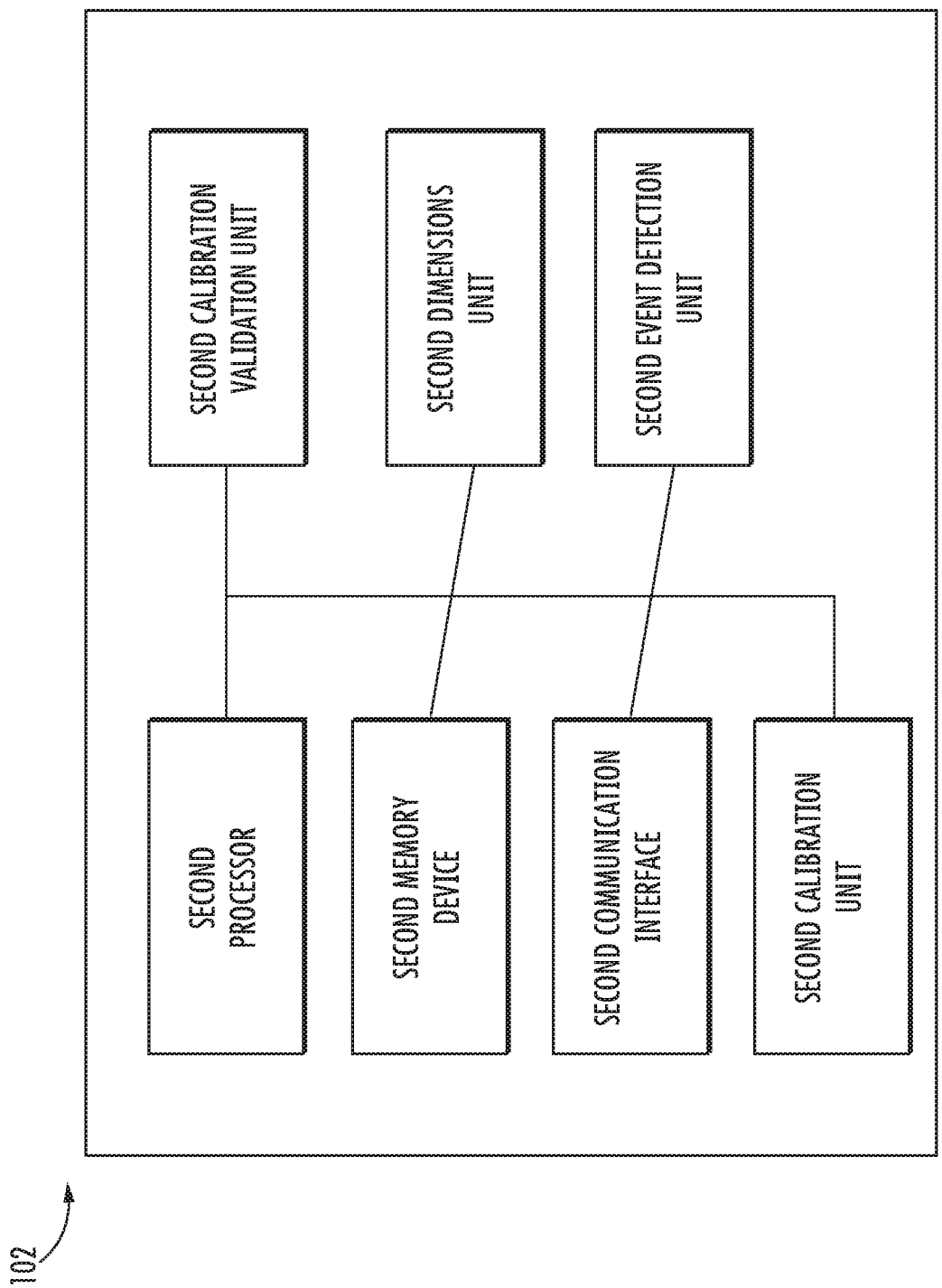
FIG. 13 illustrates a block diagram of a dimensioner, according to one or more embodiments described herein.

FIG. 13 illustrates a block diagram 1300 of the dimensioner 102, according to one or more embodiments described herein. The dimensioner 102 includes a second processor 1302, a second memory device 1302, a second communication interface 1306, a second calibration unit 1308, a second calibration validation unit 1310, a second dimensioning unit 1312, and a second event detection unit 1314.

In an example embodiment, the second processor 1302, the second memory device 1304, the second communication device 1306, the second calibration unit 1308, the second calibration validation unit 1310, the second dimensioning unit 1312, the second event detection unit 1314, may have a similar structure and similar functionality as to the first processor 202, the first memory device 204, the first communication interface 206, the first calibration unit 208, the first calibration validation unit 210, the first dimensioning unit 212, and/or the first event detection unit 214, respectively.

For example, the second event detection unit 1314 may be configured to detect an event on the dimensioner 102. Thereafter, based on the detection of the event on the dimensioner 102, the second calibration unit 208 may be configured to perform the self-calibration operation on the dimensioner 102, as is described in the flowchart 1000.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the dimensioning. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A method for calibrating a dimensioner, the method comprising:

receiving, by a processor, two or more previously captured images of a common field of view of the dimensioner;

identifying, by the processor, at least one static object in the common field of view of the dimensioner, wherein the at least one static object is common to each of the two or more previously captured images, and wherein the at least one static object is located at a fixed position in each of the two or more previously captured images;

29 determining, by the processor, one or more reference dimensions of the at least one static object based on the two or more previously captured images;

detecting, by the processor, an event on the dimensioner;

determining, by the processor, one or more updated dimensions of the at least one static object;

comparing, by the processor, the one or more updated dimensions to the one or more reference dimensions to determine if the one or more updated dimensions satisfy a predefined dimension error range; and in an instance in which the one or more updated dimensions fail to satisfy the predefined dimension error range, modifying, by the processor, one or more parameters associated with the dimensioner.

2. The method of claim 1 further comprising iteratively modifying, by the processor, the one or more parameters of the dimensioner and iteratively determining, by the processor, the one or more updated dimensions of the at least one static object based on the one or more modified parameters, until the one or more updated dimensions of the at least one static object satisfy the predefined dimension error range.

3. The method of claim 1 wherein identifying the at least one static object further comprises subtracting, by the processor, the two or more previously captured images amongst each other to identify the at least one static object.

4. The method of claim 1 further comprising:

causing, by the processor, a first image capturing device of the dimensioner to capture a first current image of the common field of view of the dimensioner;

subtracting, by the processor, the first current image of the common field of view from at least one of the two or more previously captured images to determine whether the at least one static object is present in the first current image;

in an instance in which the at least one static object is absent from the first current image, generating, by the processor, a first error notification indicative of the absence of the at least one static object in the first current image.

5. The method of claim 1 further comprising:

comparing, by the processor, the one or more updated dimensions of the at least one static object with the one or more reference dimensions to determine an error in the one or more updated dimensions; and determining, by the processor, whether the determined error is within the predefined dimension error range.

6. The method of claim 1 further comprising:

causing, by the processor, a projector of the dimensioner to project structured light in the common field of view comprising the at least one static object;

causing, by the processor, a first image capturing device of the dimensioner to capture a first current image of the common field of view of the dimensioner;

causing, by the processor, a second image capturing device of the dimensioner to capture a second current image of the common field of view, based on the projected structured light; and determining, by the processor, the one or more updated dimensions of the at least one static object based on the first current image, the second current image, and the one or more parameters associated with the dimensioner.

7. The method of claim 1, wherein the one or more parameters of the dimensioner comprise at least one of a correlation between the projector and the second image capturing device, the focal length of the first image capturing device, or the focal length of the second image capturing device.

8. The method of claim 1, wherein the detected event corresponds to at least one of elapsing of a predetermined time period, initiating determination of one or more dimensions of an object, or powering on the dimensioner.

9. A dimensioner comprising:

a first image capturing device configured to capture a first current image of a common field of view of the dimensioner;

a second image capturing device configured to capture a second current image of the common field of view of the dimensioner;

a projector configured to project a pattern of structured light in the common field of view of the dimensioner, wherein the second current image is captured based on the projected pattern;

a processor communicatively coupler with the first image capturing device and the second image capturing device, wherein the processor is configured to:

receive two or more previously captured images of the common field of view of the dimensioner;

identify at least one static object in the common field of view of the dimensioner, wherein the at least one static object is common to each of the two or more previously captured images, and wherein the at least one static object is located at a fixed position in each of the two or more previously captured images;

determine one or more reference dimensions of the at least one static object based on the two or more previously captured images;

detect an event on the dimensioner;

determine one or more updated dimensions of the at least one static object;

compare the one or more updated dimensions to the one or more reference dimensions to determine if the one or more updated dimensions satisfy a predefined dimension error range; and in an instance in which the one or more updated dimensions fail to satisfy the predefined dimension error range, modify one or more parameters associated with the dimensioner.

10. The dimensioner of claim 9, wherein the processor is further configured to iteratively modify the one or more parameters of the dimensioner and iteratively determine the one or more updated dimensions of the at least one static object based on the one or more modified parameters, until the one or more updated dimensions of the at least one static object satisfy the predefined dimension error range.

11. The dimensioner of claim 9, wherein the processor is further configured to subtract the two or more previously captured images amongst each other in order to identify the at least one static object.

12. The dimensioner of claim 9, wherein the processor is further configured to:

cause the first image capturing device to capture a first current image of the common field of view of the dimensioner;

subtract the first current image of the common field of view from at least one previously captured image of the two or more previously captured images to determine whether the at least one static object is present in the first current image;

in an instance in which the at least one static object is absent from the first current image, generate a first error notification indicative of the absence of the at least one static object in the first current image.

13. The dimensioner of claim 9, wherein the processor is configured to:
    compare the one or more updated dimensions of the at least one static object with the one or more reference dimensions to determine an error in the one or more updated dimensions; and
    determine whether the determined error is within the predefined dimension error range.

14. The dimensioner of claim 9, wherein the processor is further configured to:
    cause the projector to project a pattern of structured light in the common field of view comprising the at least one static object;
    cause the first image capturing device to capture a first current image of the common field of view;
    cause a second image capturing device to capture a second current image of the common field of view, based on the projected structured light; and
    determine the one or more updated dimensions of the at least one static object based on the first current image, the second current image, and the one or more parameters associated with the dimensioner.

15. The dimensioner of claim 9, wherein the one or more parameters of the dimensioner comprise at least the one of a correlation between the projector and the second image capturing device, the focal length of the first image capturing device, or the focal length of the second image capturing device.

16. The dimensioner of claim 9, wherein the detected event corresponds to at least one of elapsing of a predetermined time period, initiating determination of one or more dimensions of an object, or powering on the dimensioner.

17. The dimensioner of claim 9, further comprising one or more orientation sensors communicatively coupled to the processor, wherein the processor is configured to:
    cause the one or more orientation sensors to determine a current orientation of the dimensioner;
    determine whether the current orientation of the dimensioner exceeds a predetermined orientation threshold; and
    in an instance in which the current orientation of the dimensioner exceeds the predetermined orientation threshold, generate a first error notification indicative of the change in the orientation of the dimensioner.

* * * * *